INVENTOR.
EDWARD S. PETERSON
BY
ATTORNEY

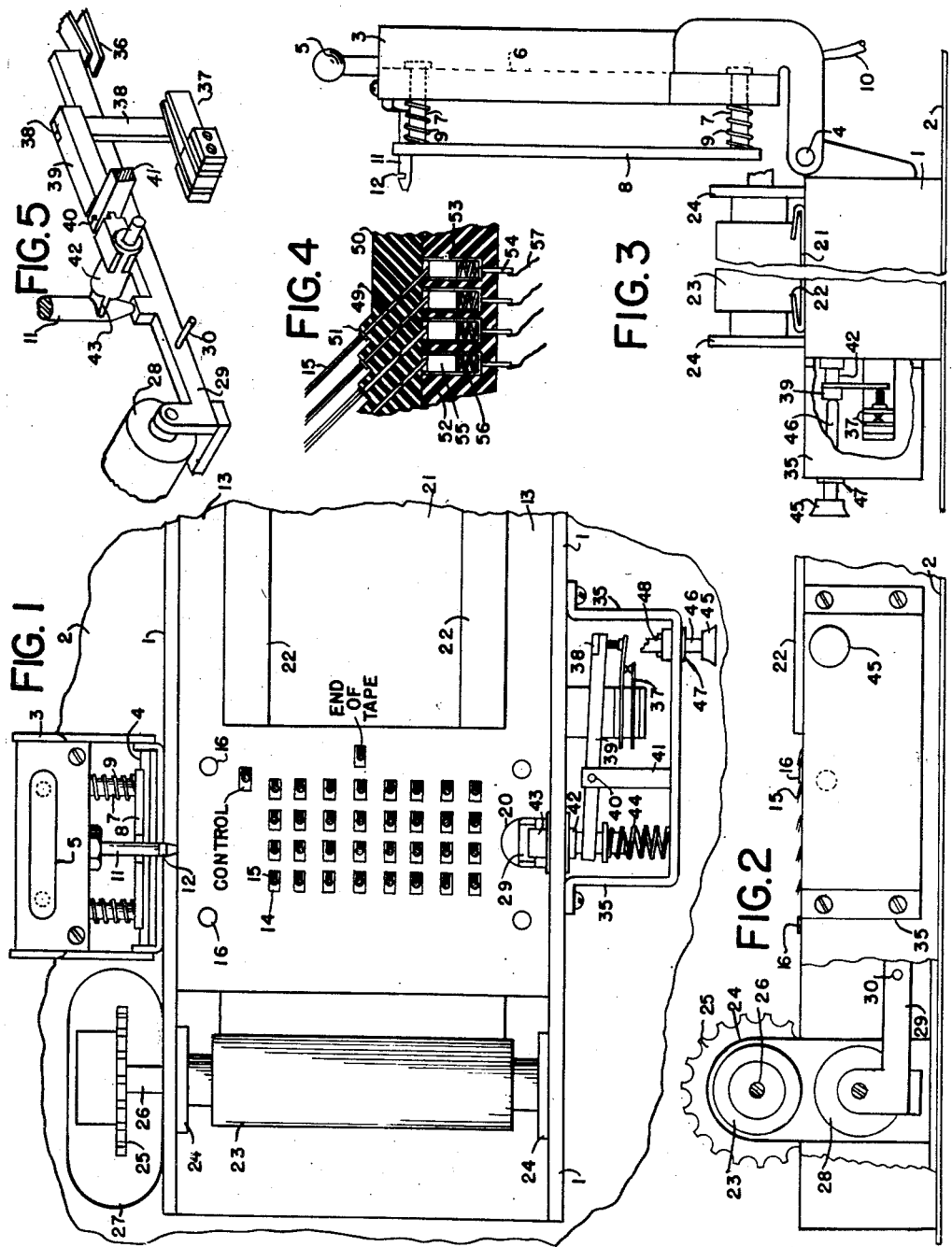
Dec. 30, 1952 — E. S. PETERSON — 2,623,694
MERCHANDISE DISPENSING AND RECORDING SYSTEM
Filed Feb. 26, 1947 — 9 Sheets-Sheet 1
INVENTOR.
EDWARD S. PETERSON
BY
ATTORNEY Dec. 30, 1952  E. S. PETERSON  2,623,694
MERCHANDISE DISPENSING AND RECORDING SYSTEM
Filed Feb. 26, 1947  9 Sheets-Sheet 2

Dec. 30, 1952  E. S. PETERSON  2,623,694
MERCHANDISE DISPENSING AND RECORDING SYSTEM
Filed Feb. 26, 1947  9 Sheets-Sheet 3
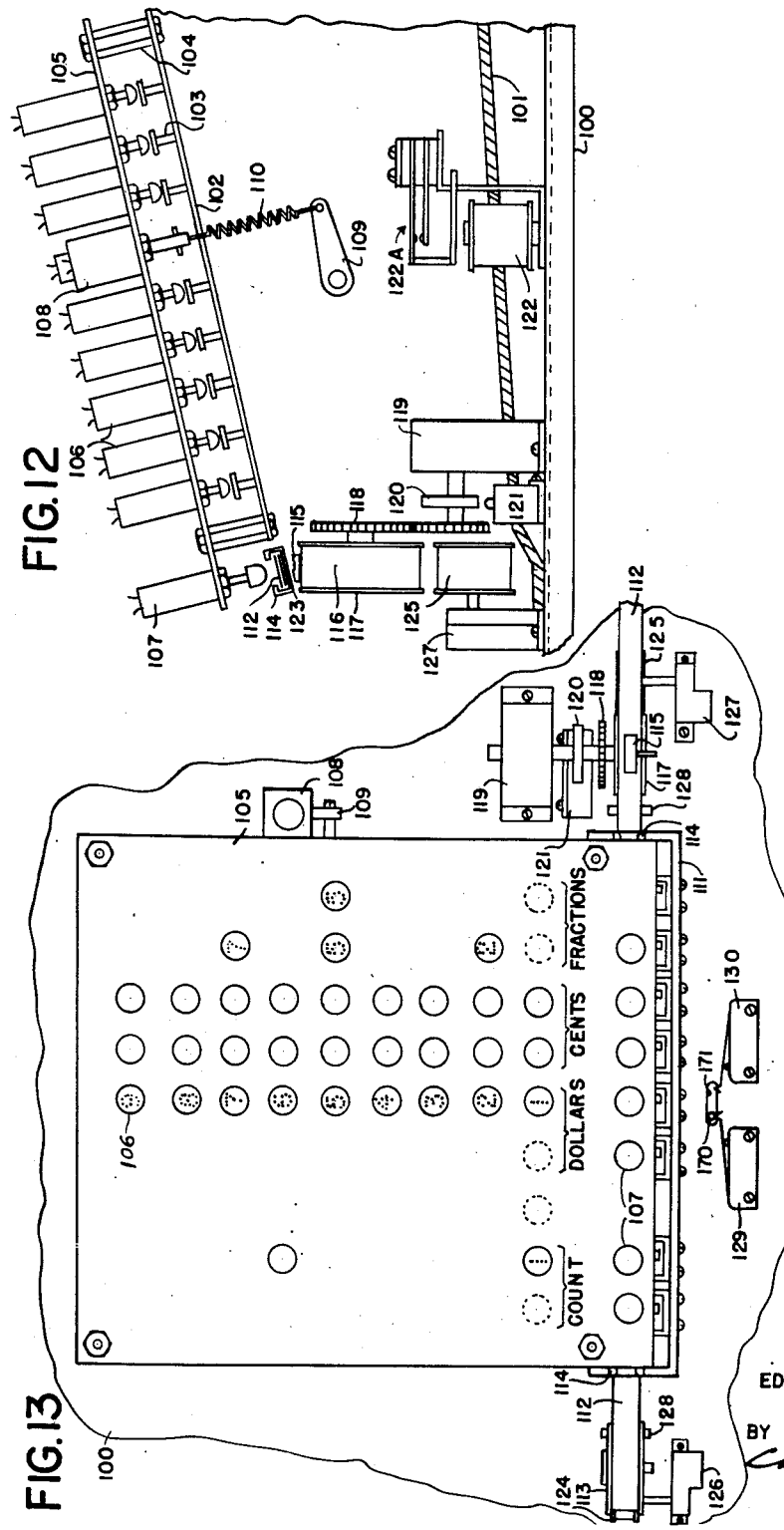
INVENTOR.
EDWARD S. PETERSON
BY
ATTORNEY Dec. 30, 1952 E. S. PETERSON 2,623,694
MERCHANDISE DISPENSING AND RECORDING SYSTEM
Filed Feb. 26, 1947 9 Sheets-Sheet 4
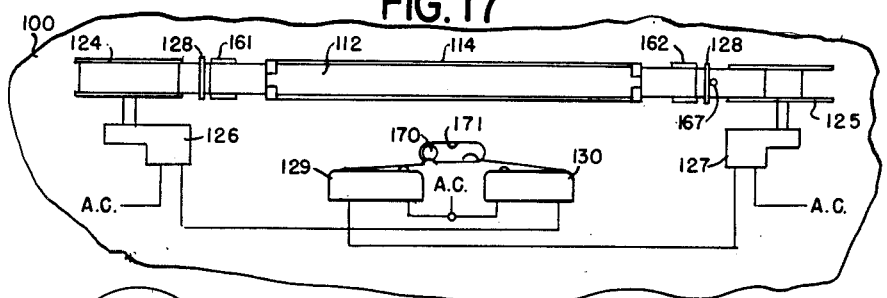
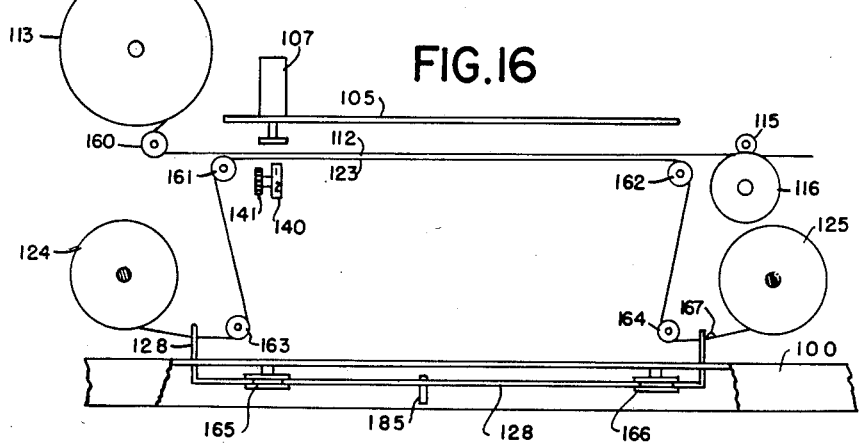
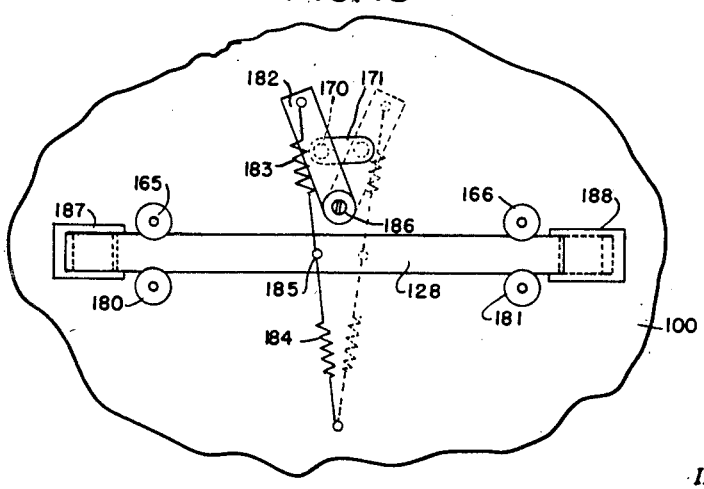
INVENTOR.
EDWARD S. PETERSON
BY
ATTORNEY

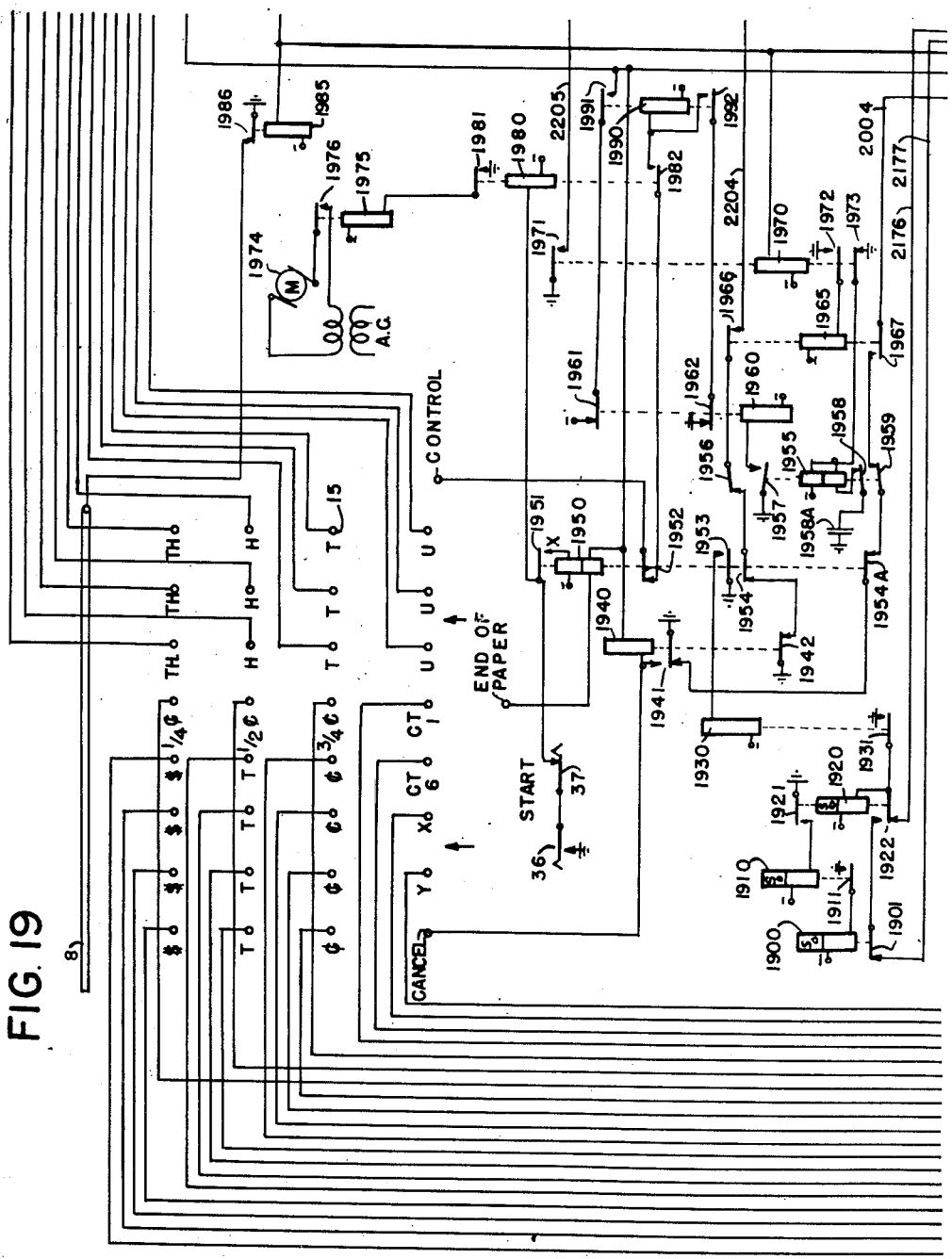

Dec. 30, 1952     E. S. PETERSON     2,623,694
MERCHANDISE DISPENSING AND RECORDING SYSTEM
Filed Feb. 26, 1947     9 Sheets-Sheet 6

INVENTOR.
EDWARD S. PETERSON
BY
ATTORNEY

Dec. 30, 1952  E. S. PETERSON  2,623,694
MERCHANDISE DISPENSING AND RECORDING SYSTEM
Filed Feb. 26, 1947  9 Sheets-Sheet 7

INVENTOR.
EDWARD S. PETERSON
BY
ATTORNEY

Dec. 30, 1952 E. S. PETERSON 2,623,694
MERCHANDISE DISPENSING AND RECORDING SYSTEM
Filed Feb. 26, 1947 9 Sheets-Sheet 8

INVENTOR.
EDWARD S. PETERSON
BY
ATTORNEY

Dec. 30, 1952 E. S. PETERSON 2,623,694
MERCHANDISE DISPENSING AND RECORDING SYSTEM
Filed Feb. 26, 1947 9 Sheets-Sheet 9
FIG. 23
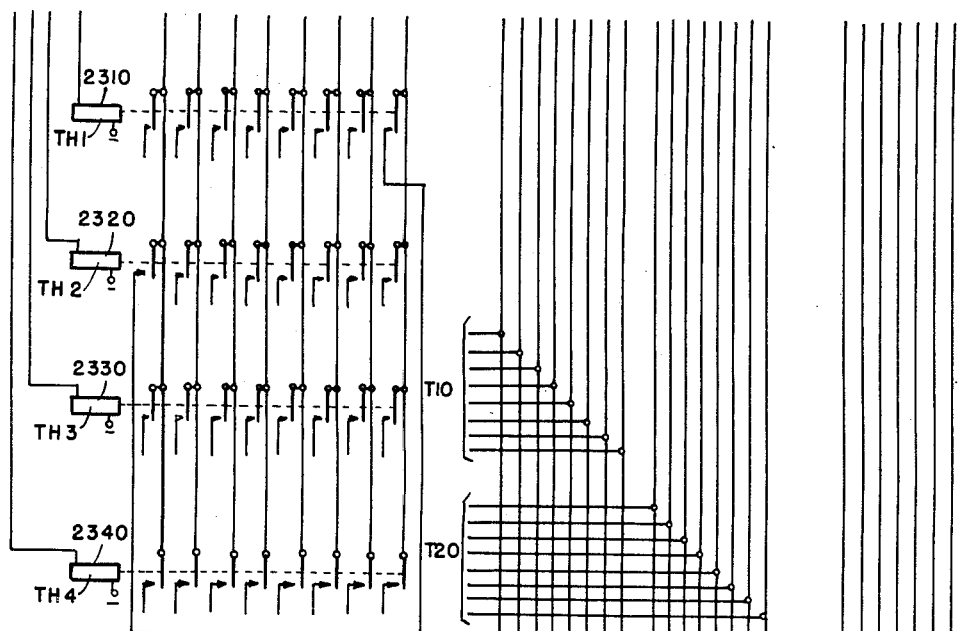
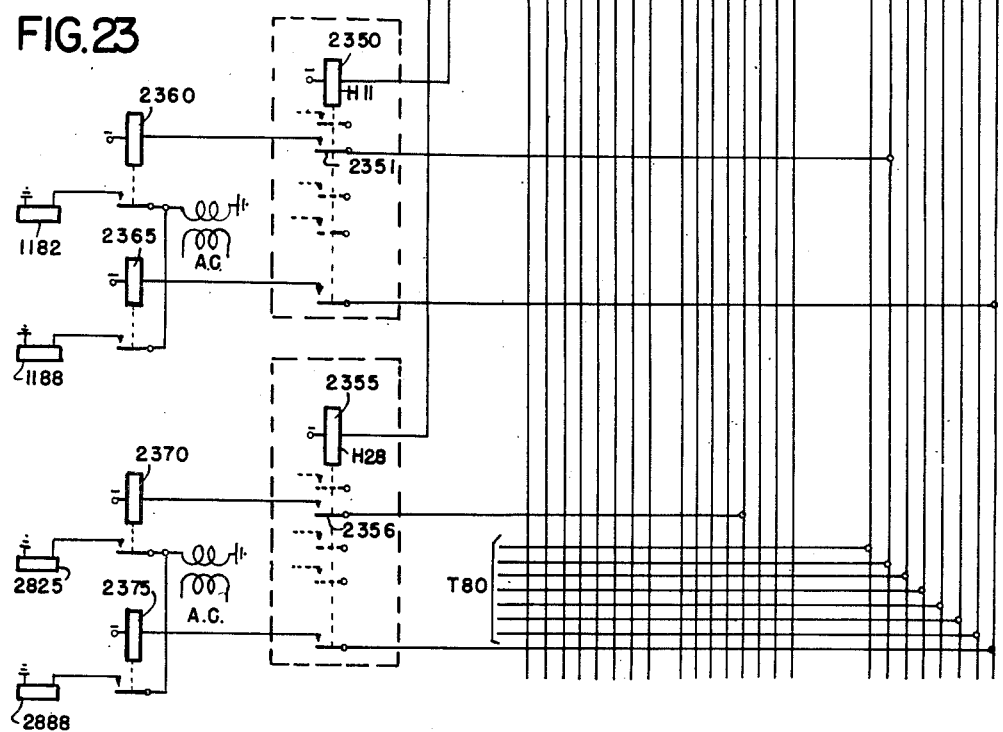
INVENTOR.
EDWARD S. PETERSON
BY
ATTORNEY Patented Dec. 30, 1952

2,623,694

UNITED STATES PATENT OFFICE 2,623,694

MERCHANDISE DISPENSING AND RECORDING SYSTEM

Edward S. Peterson, Elmwood Park, Ill., assignor to Automatic Electric Laboratories, Inc., Chicago, Ill., a corporation of Delaware Application February 26, 1947, Serial No. 731,153

13 Claims. (Cl. 235—61.11)

This invention relates to improvements in remotely controlled merchandise dispensing and data recording systems, and particularly to such a system controlled from a perforated tape. The principal application envisioned for this system is for a retail store, such as a grocery store, dealing primarily in packaged goods sold for cash and in large volume, on a self service basis.

In such a store, the merchanidse would be stored on upper floors or on a mezzanine or both, from where it would be loaded into dispensing chutes leading to the main floor. These dispensing chutes would be provided with a gate mechanism at their lower end, which when operated would cause one item or package to be ejected onto a moving conveyor belt. This conveyor belt in turn, would convey the ejected package or item swiftly to a central wrapping and cashier's station.

The stated wrapping and cashier's station would most likely be at the front end of the main floor so as to allow room for a large number of chutes disposed transversely across the rear end of the store. Arranged around the walls, or wherever else convenient, would be a number of illuminated display cases containing a sample of each item of merchandise sold. Each display case would also be provided with an opening or slot for each item displayed, to permit the selection of such item by a customer. At the bottom of each slot would be a stick of printer's type containing the name of the item and its price, together with a small set of tape punches or perforators, in the form of metal pins.

As each customer enters the store, he or she takes from a rack a small elongated tape punch having outside dimensions corresponding to the dimensions of the selection slots in the display cabinets. The customer carries this punch by a handle provided on the back end, and, to select an order, has merely to insert the forward end thereof into those selection slots corresponding to the items desired. Each insertion of the punch into a slot causes the name and price of the corresponding item to be printed from the type in the slot onto a paper tape concealed inside of the punch, while the pins in the slot punch a group of holes in the tape in a given code pattern corresponding to said item and price information. A number of other holes may also be punched into the pattern or group of holes by the pins at the same time, for various control purposes, as well be seen. Each withdrawal of the punch causes the tape to advance automatically to a new setting, so that the different groups of holes representing the various items of the customer's order, are in spaced-apart relationship to one another, along the length of the tape.

To select several items of the same kind, assuming them to be normally sold singly, the customer has only to insert the punch into the same slot as many times as may be necessary. Guides are provided to prevent the punch from being inserted in the wrong matter. This punch, however, together with the display cabinets and slots, and the general arrangement of the store, do not form part of the present invention, and are described briefly herein merely as background, to facilitate the complete understanding of the invention.

After the customer has completed the selection of the order, in the manner described, he or she hands the punch to the cashier at the previously mentioned cashier's position. The cashier will detach the perforated length of tape and restore the punch, or cause it to be restored, to the rack from whence it was originally taken. The cashier then inserts the front end of the tape into a tape translator mounted on the top of the counter, and closes the translator cover over it. This starts a small motor under the counter which thereupon proceeds to drive the tape through the translator and over a set of sensing brushes therein, at high speed.

As the various groups of holes in the tape pass over the sensing brushes, they close electrical circuits which cause the operation of the required merchandise chutes, and the ejection thereby of the items of the customer's order, which are then delivered, by the conveyor belt or belts, to a wrapping counter near the cashier's position. Each group of holes at the same time, also causes an electrically operated adding machine at the cashier's position to accumulate the prices of the different items, and to count the number of items involved. At the completion of the passage of the tape through the translator, the adding machine automatically prints the total of the number of items and the total price, on a second tape, resets itself, and feeds out the printed section of tape for the use of the cashier and the wrapping clerk, the entire operation, from the starting of the tape to the delivery of the goods at the wrapping counter and the ejection of the recording tape at the cashier's position, being completed in a matter of a few seconds.

It will be apparent from the foregoing summary, that a considerable amount of electrical and mechanical equipment, including a large number of chutes, would be required for such an installation. The cost of this equipment can be justified only by proportionate savings in space costs, labor costs or general overhead costs. It will be obvious therefore, that high speed and reliability of operation are essential in order to produce a large volume of business with a minimum equipment and personnel.

The main object of my invention is therefore the provision of a remotely controlled merchandise dispensing system of the type described which operates at high speed with simple straightforward circuits, and maximum reliability of operation.

One feature of my invention is the use of a very small and simple translator of comparatively low cost, using contact brushes arranged in a plurality of rows and columns very close together. The use of brushes permits high speed operation, and their arrangement in rows and columns permits the use of a tape of convenient width.

Another feature of the invention is the use of code relays arranged on a digital basis, in both the chute and price selection circuits. These relays are controlled from the tape and the translator brushes, and this double coding arrangement permits a very large number of selections from a small number of brushes and a still smaller number of perforations per group.

Another feature consists of a control, or start circuit, operated from a special perforation in each group of perforations in the tape, whose function it is to permit operation of the select, or code relays, only when all of the perforations of the group are over their respective brushes. This is necessary to prevent false operations, or needless pumping of these relays, since each of the holes in the tape will pass over all of the brushes of the corresponding row, either on the approach thereto, or upon the departure therefrom.

A further feature consists in the use of all-relay control and timing circuits, which also contributes to fast operation, and to uniformity of equipment and mountings, which is also conducive to lower costs.

Still another feature consists in the use of a high speed adding machine of the single-action, non-locking-key type, commonly known as a Comptometer, for doing the recording. Since this machine does not normally print the figures, but merely accumulates the totals, in direct response to the key action, on a set of number display wheels visible to the operator, the possible speed attainable is considerably greater than with the usual printing type adding machine, which requires a printing bar operation for each number of the series, as well as for the final total. The Comptometer has been modified by substituting type wheels for the number display wheels, and adding a printing means, to permit the printing of totals only. A number of electromagnets, or solenoids, have also been added to permit operation by remote control.

A further feature comprises circuits operated automatically from the translator in response to the passage of the rear end of the customer's tape, to actuate the aforementioned printing mechanism, which thereupon prints the total cost of the order and the total number of items included.

Other features consist in the addition to the Comptometer of automatic tape-feed and ink-ribbon-feed mechanisms, in addition to the key operating magnets and a reset magnet for automatically resetting the type wheels after the printing operation.

Still another feature consists in the use of separate adding machines for different classes of merchandise, and the automatic selection and operation thereof, from the customer's tape. Another feature provides an additional adding machine for accumulating and printing the overall totals for each such order including items in different classes, and a grand total machine for accumulating the total of all orders passed through the translator during the day.

Other objects and features of the invention will be apparent from the specification and claims following, considered in conjunction with the accompanying drawings comprising Figures 1 to 23 inclusive, which illustrate one embodiment of the invention. It will be apparent that numerous changes in the general arrangement are possible without affecting the breadth or scope of the invention. Also the general application of the system is not meant to be limited to use in a retail store, since it could also be used for a wholesale or a mail order house, where clerks would be enabled to select customers' orders by remote control. In this case the display cabinets would probably be unnecessary, since the select slots could be identified by catalog number only. In fact, the tapes could be prepared in some entirely different manner, since the present invention starts with the prepared tape.

With reference to the drawings, Figures 1 to 7 inclusive illustrate the translator and associated equipment, Figures 8 to 11 one of the merchandise chutes, Figures 12 to 18 the calculating machine or Comptometer and Figures 19 to 23 the basic or overall circuit.

Figure 1 is a partial top view of the tape translator with the main cover back, showing the tops of the brushes. The main paper drive roller and the latching mechanism are also shown, with their protective covers removed.

Figure 2 is a partial front elevation of the translator, with a portion broken away to show the lower or idler paper drive roller, and its control bar.

Figure 3 is a side elevation of the translator with the cover back, and the body broken through the center to conserve space. A portion of one end of the mounting bracket for the latching mechanism is also shown broken away as an aid in visualizing the relationship of some of the parts.

Figure 4 is an enlarged sectional side view of some of the translator brushes, showing the method of mounting in insulating blocks.

Figure 5 is an enlarged perspective view of the start and latching mechanism of the translator, including the start contact springs and the paper-feed idler roller controlled by this mechanism.

Figures 12 and 13 are partial side and top views respectively of the Comptometer, indicating the general arrangement of the key-operating, reset, and printing magnets or solenoids, the type wheels, and the feed mechanisms for the recording tape and the ink ribbon, which have been added to this machine, without effect on its internal operation.

Figure 14 is an enlarged top view of one of the type wheels, which are just visible in the lower part of Figure 13.

Figure 15 shows a portion of the recording tape with a typical printing thereon including an item count of 2 at the left, and a money total of 32 cents at the right.

Figure 16 shows in diagrammatic form, a front view of the printing mechanism, including the paper-tape and ink-ribbon supply spools, the ink-ribbon reversing bar, the tape driving rollers, a type wheel, and a printing magnet.

Figure 17 shows in diagrammatic form, a top view of the ink ribbon feed mechanism including the two supply spools one full and one empty, the driving motors, the ribbon guides, the reversing switches and the tips of the reversing bar, while Figure 18 shows the reversing bar as seen from below.

Figure 20:
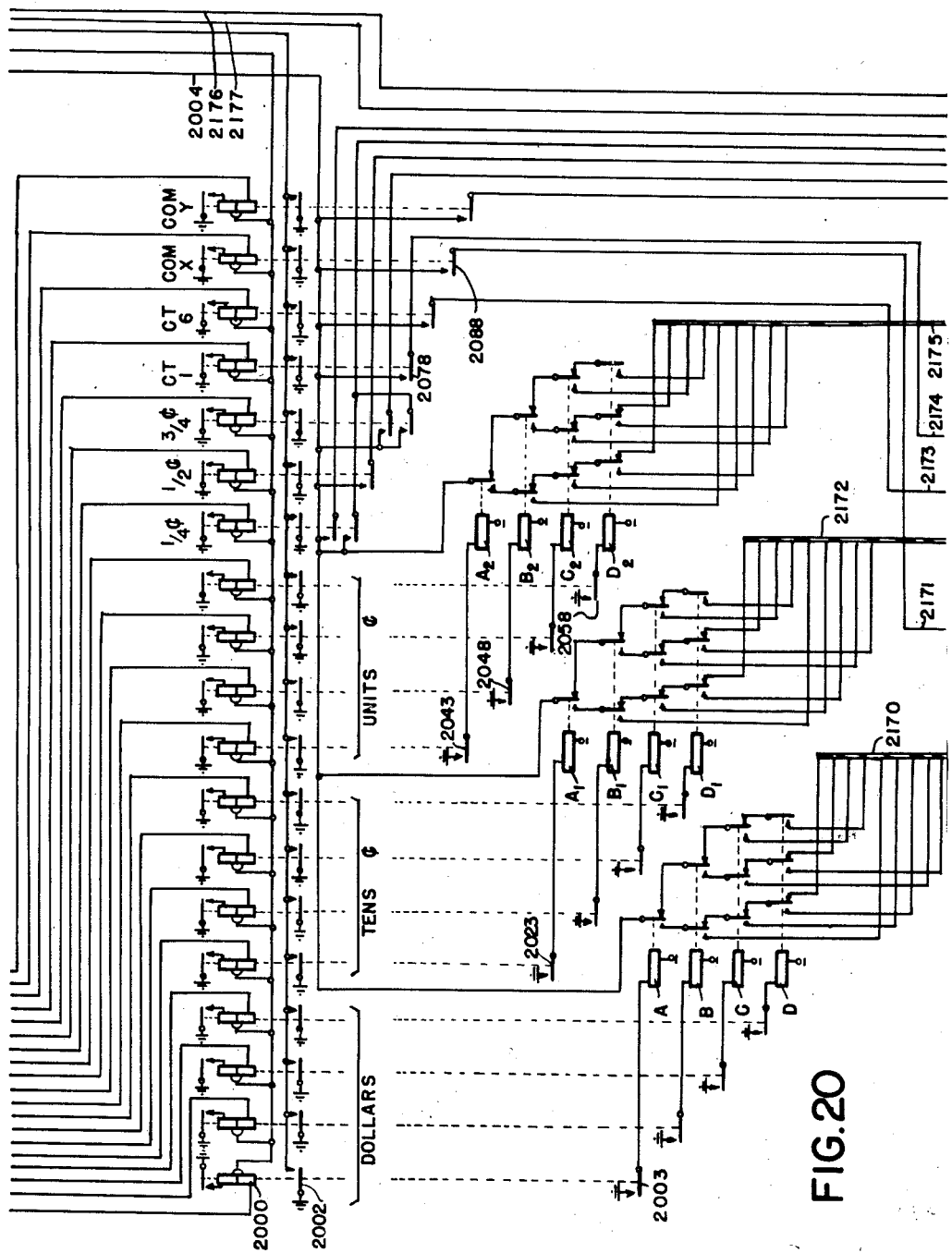
Figure 21:
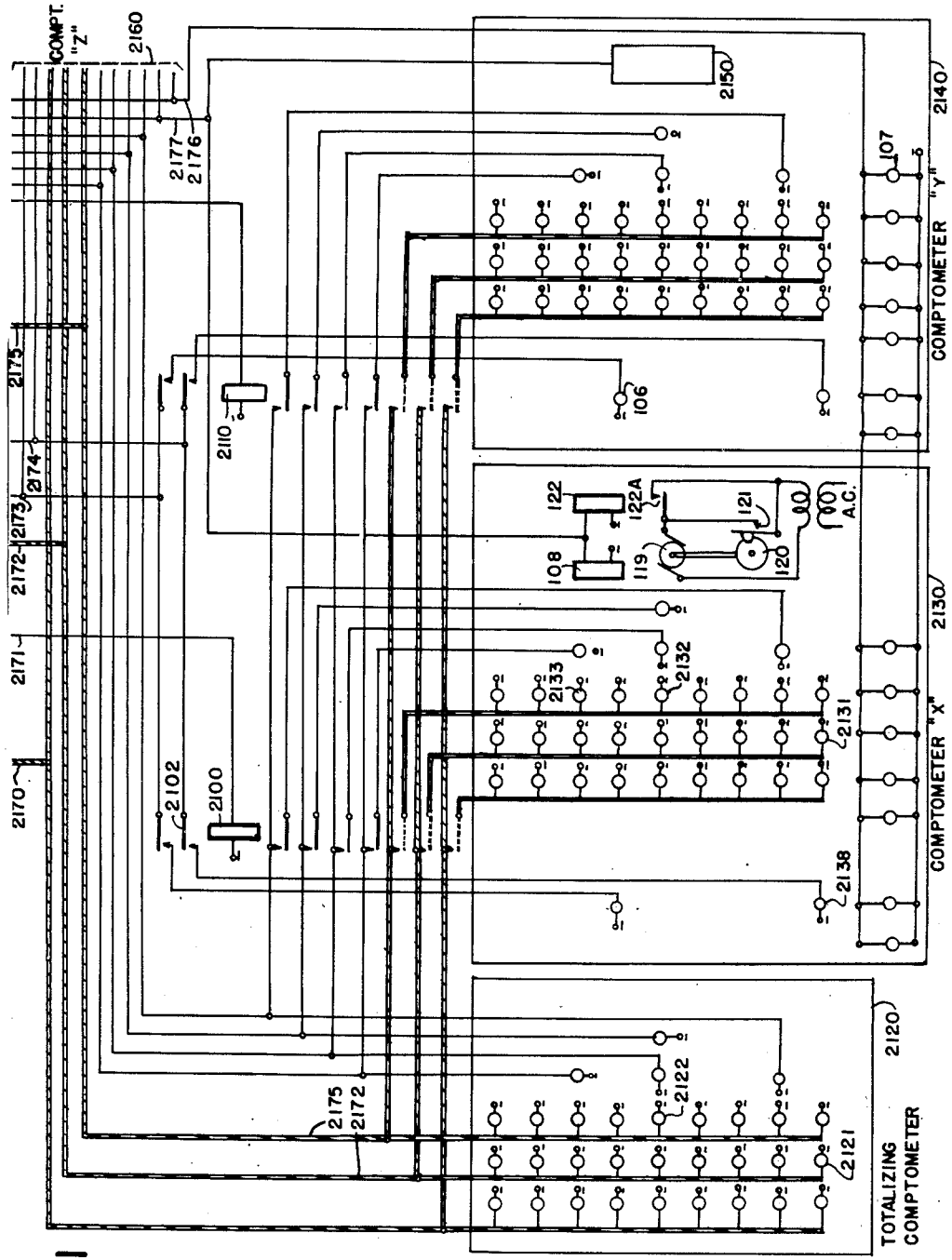
Figure 22:
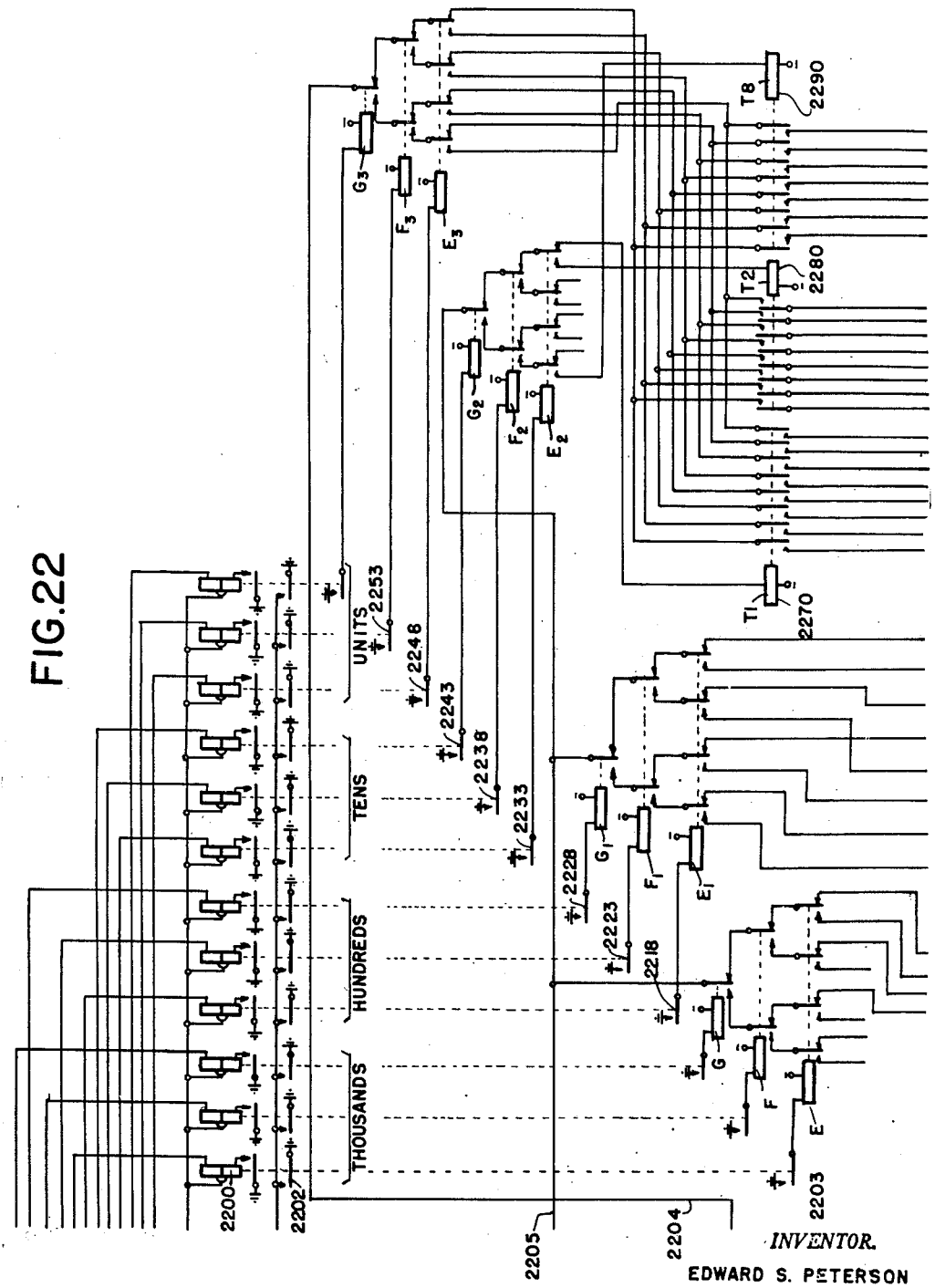

Figures 19 to 23 show in diagrammatic form the basic electrical circuits required for operating the system, as previously indicated. Thus, Figure 19 shows the connections for the translator top plate and brush circuits, start switch and driving motor, and the miscellaneous translator control relays; Figure 20 shows the select relays for operating the adding machine or machines; Figure 21 shows the adding machine circuits with the ink ribbon circuit omitted; Figure 22 shows a portion of the select relays for operating the merchandise chutes; and Figure 23 shows the remainder of the chute select relays, up to and including the chute operating magnets. In fitting these circuits together Figure 22 should be placed on the right of Figure 19, with Figure 20 directly below Figure 19, Figure 21 below Figure 20, and Figure 23 below Figure 22.

Referring to the drawings and equipment in more detail, the translator, shown in Figures 1 to 5, may be seen to consist of a box or housing 1, mounted on a base plate 2 arranged to be secured in place over a hole in the cashier's counter. This translator is provided with a small brush cover 3, hinged to the housing at 4, and provided with an insulated handle 5. Inside this cover and flush with the lower edge thereof is a phenolic plate 6 (Fig. 3) carrying four slidably mounted studs 7, the outer ends of which thread into a stainless steel contact plate 8 held resiliently a short distance below the cover by coiled springs 9 mounted on the studs 7. An electrical connection is made to this contact plate by means of an insulated stranded wire 10 which is brought in through an insulating bushing, not shown, in the rear end of the cover, and soldered to the head of one of the studs 7. A pointed latching pin 11 having a locking slot 12 just above the slope of the tip, is securely mounted to the front end of the phenolic plate 6, and extends for some distance below and at right angles to said plate, through a semi-circular opening cut in the front edge of the contact plate 8.

The central portion of the housing 1 is covered with a phenolic plate 13 (Fig. 1), provided with holes 14 for the contact brushes 15, which are arranged in four rows of eight across the middle of the translator, plus two additional "control" and "end of tape" brushes, located as shown. The plate 13 is also provided on its front edge with a semi-circular opening 20 through which the latching pin 11 passes when the cover is closed, to engage the latching mechanism, and thereby hold the contact plate 8 down against the brushes 15, by the tension stored in the coiled springs 9 from the act of forcing the cover shut. Four raised metallic inserts 16 in the plate 13 serve to limit the bending or deformation of the brushes, which protrude for a slight distance above the upper surface of this plate. Also mounted above the plate 13, at the entering end of the translator, and just to the right of the cover, is a sheet metal paper guide 21 having turned in edges 22, for guiding the perforated tape properly over the brushes. To conserve space, a portion of this guide has been omitted, since its nature and construction are conventional, and fairly obvious.

At the outlet end of the translator and just above the top surface thereof, is a soft rubber drive roller 23 rotatably mounted between end plates 24, which are securely fastened to the inside side walls of the housing 1 which is open at this point. A sprocket wheel 25, mounted on an extension of the drive roller shaft 26, over a hole 27 in the base plate 2, is driven by a chain drive, not shown, from a small electric motor, not shown, on the under side of the base plate. Just below the drive roller 23, on the inside of the housing, is a soft rubber idler roller 28 normally out of contact with the drive roller 23. This idler roller is rotatably mounted on a forked control bar 29 as has been shown in Figure 2 by breaking away a portion of the side of the housing and the near end plate. The control bar 29 is pivoted at 30 in such a way that when the cover 3 is closed and latched, the latching pin 11 presses the right end of the control bar downwards in the manner shown in detail in Figure 5, thereby raising the left end of the control bar, and forcing the idler roller 28 up against the drive roller 23. A cover guard, not shown, is provided for the sprocket wheel and drive roller.

The control bar and latching mechanisms are shown in detail in Figure 5, as already indicated. Top and end views of the latching mechanism, with its U-shaped housing 35, are also shown in Figures 1 and 3, with the housing partly broken away in Figure 3. A small auxiliary cover, not shown, fastens to the front of the housing 35 with screws. The right hand end of the control bar 29, which is completely shown in Figure 5, normally rests lightly on a pair of normally open contact springs 36, which form a part of the start circuit. A second pair of contact springs 37, which also form a part of the start circuit, and are connected in series with springs 37, are held normally closed by an extension 38 on a rocker arm 39. The left end of the rocker arm 39, which is pivoted at 40 on the fixed post 41, is loosely yoked to a latching bar 42. This latching bar 42 is slidably mounted in a bushing in the front wall of the housing 1, so that its flat tip or tongue 43 projects inside of the housing and into the path of the latching pin 11 in the aperture 20 of Figure 1, where it is held under pressure by the coiled spring 44.

When therefore, the cover 3 is closed and pressed shut, the sloping forward edge of the latching pin 11 is forced against the rear edge of the tongue 43, thereby forcing the latching bar 42 outward. The rocker arm 39 and the extension 38 are thus rocked in an anti-clockwise direction, and cause the start contacts 37 to open by relieving the pressure thereon. At the same time, the tip of the latching pin 11 presses down on the right side of the control bar 29, thereby closing the start contacts 36 and raising the idler roller 28 into engagement with the drive roller 23. The start circuit is now closed at springs 36 but open at springs 37. Further pressure on the cover 3 finally brings the slot 12 of the latching pin in line with the tongue 43 of the latching bar and the latter is pressed forward into the slot by the coiled spring 44. This stops the movement of the cover 3, and locks it securely in the closed position. At the same time, it also causes rocker arm 39 to rotate a short distance in a clockwise direction, to again close start contacts 37. The start circuit is now complete, and the translator motor starts automatically, in a manner to be described later.

For unlocking the cover 3 and stopping the motor, a push button 45 is provided which threads onto the front end of a push rod 46, slidably mounted in a bushing 47 in the face of the U-shaped housing 35. The rear end of the push rod 46 normally rests against the right end of the rocking arm 39 (see Fig. 3), and is normally forced outward thereby until the stop pin 48 (see Fig. 1) in the rod 46 rests against the rear side of bushing 47. Pressing in on the push button again rocks arm 39 anti-clockwise and withdraws the latching bar from the slot in the pin 11. The pressure of the springs 9 against the contact plate 8 of the cover thereupon causes the cover to snap partly open and withdraw the latching pin, thereby restoring the control and rocking bars 29 and 39, and opening start contacts 36.

The contact brushes, shown enlarged in Figure 4, each consist of a small bundle of some sixteen very fine steel piano wires 15, each approximately .010" in diameter, threaded through a small brass tube 49 which is then crimped on the outside to hold the wires firmly in place. These brass tubes or brush holders 49 are then forced into tight fitting diagonal holes accurately drilled in an insulating block 50 having sloping shoulders 51 against which rest a corresponding shoulder on the upper end of each tube 49 when the tubes are in place. The dimensions are such that when the brushes are completely home, the lower ends of the brush holder tubes protrude slightly below the bottom face of the block 50. For making the electrical connections, a second insulating block 52 carrying special terminal inserts corresponding to the brushes, is secured to the under side of the block 50 in such a way that each terminal engages the protruding end of a corresponding brush holder. These terminal inserts consist of a metal shell or cartridge 53, open at the upper end, which is flush with the upper face of the block 52, and having a tail lug 54 which extends below the block. Inside each insert is a small metal plunger 55 resting on a coiled spring 56, which presses the plunger firmly against the brush holder in order to make good electrical connection therewith. Wires 57 are finally soldered to the tail lugs 54, and taken out through an opening in the bottom of the translator housing and the base plate 2.

Figure 6:
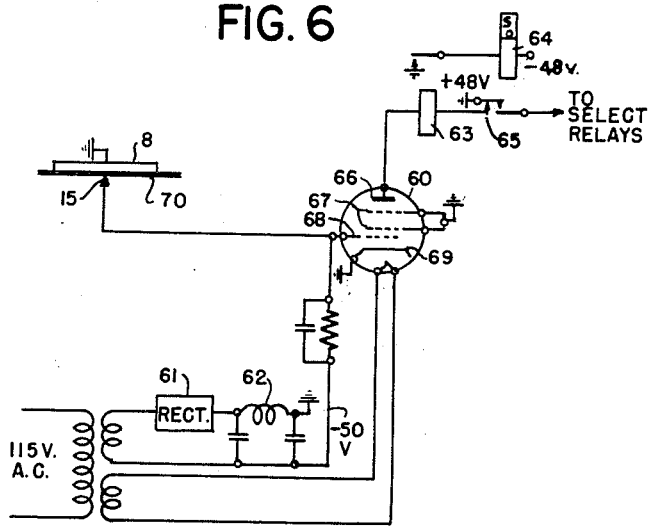
Figure 6 shows a thyratron tube circuit which may be inserted between the brushes and the code or select relays if considered desirable.

The thyratron circuit of Figure 6 is conventional. It is intended only as an alternative method of picking up the pulses from the translator, since upon trial, the system was found to operate satisfactorily without it, up to tape speeds of some three items per second. Briefly, this circuit consists of a gas thyratron tube 60 having its grid 68 normally connected to −50 volts from the dry disc rectifier 61 and the associated network 62. The grid is also connected to the corresponding translator brush 15 which is normally open. A triggering relay 63 is connected to the plate 66, and +48 volts to the cathode 69 and the shield 67. To cause the tube to fire, it is necessary to make the grid less negative, which is made possible by connecting +48 volts to the translator contact plate 8. Thus, when a hole in the paper tape 70 passes over the brush 15, the brush circuit is momentarily completed, the grid becomes momentarily less negative, and the tube fires between cathode and plate. This operates relay 63, which in turn operates relay 64, which is made slightly sluggish through the use of a copper slug on the armature end of the core. Relay 64 operating, passes a pulse of current to the corresponding select or control relay, and at back contacts 65 opens the plate circuit, which causes the tube to stop firing. Relay 63 then restores, followed by relay 64, by which time the brush circuit is again open and the grid positive.

Figure 7:
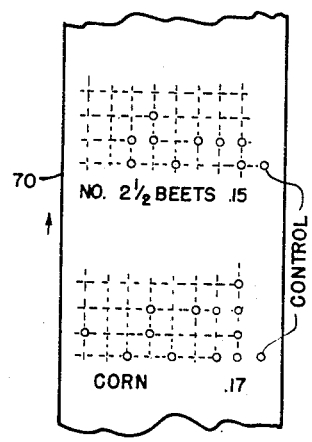
Figure 7 shows a portion of a translator tape, with two typical sets of perforations therein.
Figure 8:
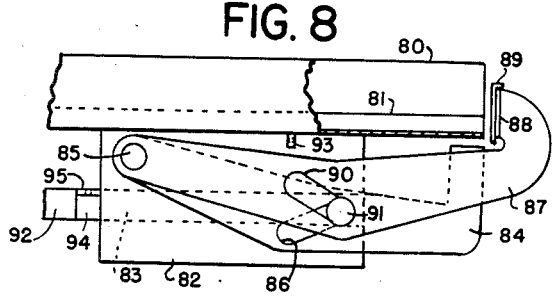
Figures 8 and 9 are side and end views of the bottom end of a chute with the gate closed.
Figure 9:
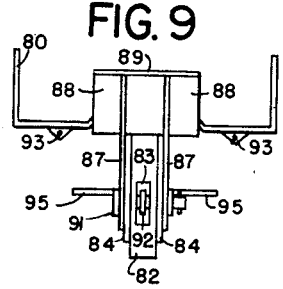
Figure 10:
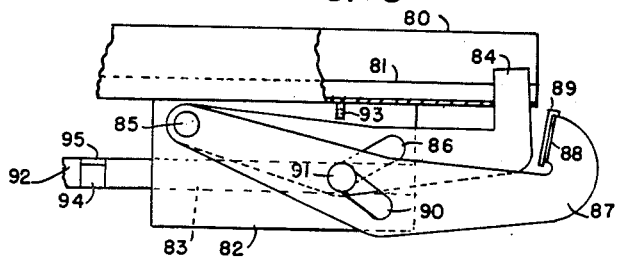
Figures 10 and 11 are similar views with the gate fully open.
Figure 11:
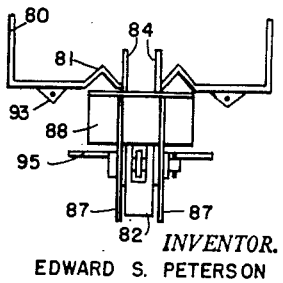

In Figure 7 is shown a section of a customer's tape 70 shown in the position in which it is inserted into the translator, with the control perforation on the right, and the direction of travel as indicated by the small arrow alongside of the tape. This tape, while preferably of paper having dimensions corresponding to an adding machine tape, might also be of some other thin material, and could be made in any desired width, to suit possible changes in the arrangement of the translator brushes, which of course could be arranged in eight rows of four as readily as in four rows of eight. The arrangement shown was considered preferable however, as a compromise between undue length in the tapes, and undue width, both of which would make handling awkward. The light dotted lines also shown are not a part of the tape, but have been added merely to show the relationship of the holes shown to the various rows and columns.

With reference to the merchandise chute illustrated in Figures 8 to 11, this chute, which may of course have various dimensions and be inclined at any suitable angle, depending on the type of merchandise involved, consists of a U-shaped metal trough 80 having raised ridges 81 in the bottom to reduce the friction and facilitate sliding. Mounted on edge on the under side of the chute along the longitudinal axis thereof, is a narrow anchor block 82 having a longitudinal slot 83 down the center, parallel with the floor of the chute. This block, while it appears as a single piece in the drawings, for convenience, is actually four pieces, a top and a bottom and two side pieces, spot welded together.

On either side of the anchor block 82 are a pair of movable stop arms 84, pivoted at 85 (Fig. 8) and having a diagonal slot 86 at the approximate center thereof. On the outside of the stop arms 84 are mounted a pair of movable curved gate arms 87, also pivoted at 85, and having tips 88 bent outwardly at right angles to which is welded a gate piece 89. These gate arms are also provided with diagonal slots 90, located similarly to the slots 86 but inclined in the reverse direction. These gate and stop arms are normally held in the position shown in Figures 8 and 9 by a pin 91 passed through the front end of the four diagonal slots in the stop and gate arms, through the slot 83 in the anchor block 82, and through a hole in the front end of a pull rod 92 which is inserted into the slot 83 from the rear, and fits loosely therein so as to be free to slide back and forth. The rear end of the pull rod 92 is connected to the plunger of an operating solenoid, not shown, and is normally held in its extreme forward position by coiled springs, not shown, connected between two turned down lugs 93 on the under side of the chute, and side ears 95 on a U-shaped bracket 94 spot welded to the pull rod in such a location as also to serve as a stop on the forward movement. When the solenoid operates, the backward movement of the pull rod 92 pulls the pin 91 back against the inclined slots, forcing the gate 87 down, and the stops 84 up through a small hole in the floor of the chute to the positions shown in Figures 10 and 11. As the gate and stops thus reverse their position, the lowermost item in the chute is released, while the stops 84 rise into the path of the next item in line. Upon the release of the solenoid, the recoiled springs previously mentioned restore the gate and stops to their original positions, and as the stops 84 move out of the path of the second item, the gate 87 rises into its path to stop it. In this way, only one item is ejected from the chute at each operation of the pull rod 92.

The adding machine used is a standard Comptometer manufactured by the Felt and Tarrant Manufacturing Company of Chicago, Illinois, generally similar to that shown and described in Patent No. 2,063,962 issued to J. A. V. Turck on December 15, 1936, except for the use of a hand crank instead of a push key for resetting, which I have modified to permit remote control operation and the printing of totals. Since the internal arrangement and operation of this machine have not been changed in any way, no details of the internal mechanism have been shown in the drawings. The reset mechanism is similar to that shown and described in Patent No. 1,357,748 issued to J. A. V. Turck on November 2, 1920.

Briefly however, this device may be described as a motor operated, multiple order, key responsive calculating machine having nine rows of digital keys, numbered similarly, from 1 to 9, for the operation of a plurality of digital display wheels, one for each row of keys, carried in a rocking frame at the front end of the machine. These display wheels carry around their periphery the numerals 1 to 0, the uppermost numerals of the different wheels being visible through openings in the top of the machine, with the zeros being normally uppermost. Each display wheel is controlled by an individual pivoted rack sector, through a train of gears having carry-over facilities to permit the accumulation of totals, and each rack sector in turn, is controlled from the keys of the corresponding row of keys, in accordance with the digital value of the operated key. Since the normal position of the display wheels is the zero position, no key operations are required for any zeros in a number.

In this machine, the operation of any key in a row trips a hooked lever, which is connected to a setting-bar fastened to an arm on the associated rack sector, into the path of a toothed wheel continuously driven by the motor. The setting bar is thereby pulled sharply to the rear, and rotates the rack sector in a preliminary or setting movement. This causes a stopping-bar located just below the bottom end of the key plungers to move in the opposite direction, until one of a plurality of differently spaced stops thereon, one for each key in the row, strikes against the shank of the depressed key. This prevents any further movement of the rack sector which is provided with friction discs which slip for the remainder of the movement of the setting bar. The location of the stops is such that the movement of the rack sectors is increased in regular angular increments with the ascending digital values of the keys.

After a definite travel distance of the setting bar, equivalent to the maximum possible travel of the rack sector, corresponding to the digit 9, the hooked lever is forced out of engagement with the motor driven toothed wheel, the sector rack is released and returns to its normal position, driving its number display wheel through a ratchet wheel in the gear train as it goes. Thus each digit struck is accumulated immediately on the display wheels, with no waiting for the completion of the setting up of a number and the operation of a printing bar or lever, as required with most printing types of calculating machines. Also the keys, while locked operated momentarily upon being struck, are restored to normal by spring tension individually, and automatically, as soon as the associated rack sector has completed its preliminary or setting movement.

To clear the machine, all of the off-normal display wheels are reset to their zero position simultaneously, through the manual operation of a short-stroke ball crank lever at the side of the machine. This causes a movement of the rocking frames sufficient to disengage the gear drive to the number wheels, whereupon the latter return under spring tension to their zero position.

The modified machine operates in the same general manner, except for being controlled by electromagnets, and that type wheels, such as shown in Figure 14, and carrying the digits 1 to 0 in type-face around their periphery, have been substituted for the display wheels to permit printing of totals. The gearing arrangement remains unchanged and all modifications other than the type wheels, are external to the Comptometer.

With reference to Figures 12 and 13, which show partial side and top views of the Comptometer and the added attachments, mounted on a special chassis, the chassis is indicated at 100, the bottom plate of the Comptometer at 101, the top plate of the Comptometer at 102, and the Comptometer keys at 103. Mounted a short distance above the top plate 102 by means of spacer posts 104, is a flat metal plate 105, on which have been mounted a number of key-operating solenoids 106, a row of printing solenoids 107, and a reset solenoid 108. The reset solenoid, which is connected to a substitute reset crank 109 by a strong coiled spring 110 to add resiliency and prevent hammering the reset mechanism against its stops, operates with an upward pull, whereas all of the other solenoids drive their plungers downward.

With reference to the rest of the special equipment shown in Figures 12 and 13, the type wheels, which are just visible in the lower part of Figure 13, are mounted as individual assemblies on a wide U shaped bracket 111, which is fastened to the framework of the machine at the sides, so that each type wheel is directly under the corresponding printing solenoid. The recording tape 112, which is a narrow paper tape about ⅜″ wide, is wound on a storage reel 113 at the left of the machine, from where it is threaded through a tape guide 114 mounted across the top of the bracket 111, and having openings in the bottom over the type wheels. At the right side of the machine, the tape feeds outward between a metal idler roller 115, and a soft rubber drive roller 116 having projecting sides 117 which also serve as tape guides. The drive roller 116 is connected through a gear train 118 to a tape driving motor 119 mounted on the chassis 100, and whose shaft also carries a cam 120 controlling a snap switch 121 also mounted on the chassis. The start circuit of the motor 119 is closed momentarily, after the printing operation by a power relay 122, and as soon as the motor starts, the cam 120 operates the snap switch 121, which holds the motor circuit closed for one revolution, independently of relay 122. In Figure 12 the ink ribbon 123 may be seen in the tape guide 114 just below the paper tape. The ink ribbon reels are also shown at 124 and 125, the ink ribbon driving motors at 126 and 127, the tips of an ink ribbon reversing bar at 128 in Figure 13, and a pair of reversing snap switches at 129 and 130.

In Figure 13, it will be noted that key operating solenoids, indicated by the solid circles in the upper part of the plate 105, are provided for all of the digit keys of the center row of the machine, representing, in this case, the dollar "units" column, and for the two rows to the immediate right of center which represent the cents "tens" and "units" columns respectively. In the fraction columns at the extreme right, four key solenoids are provided, as shown by the solid circles, to permit the accumulation of decimal fractions corresponding to quarter cents, half cents, and three-quarter cents, where such fractions may be included in some of the listed prices. And since each full revolution of a type wheel automatically advances the higher order type wheel on its left one digit, the fractions are automatically carried over into the cents, and the cents into the dollars. In the present instance, five printing solenoids have been provided for the money totals, including the dollar "tens" and "units," the cents "tens" and "units," and the "tenths of cents" columns. This permits printing totals up to $99.997, and by providing an additional type wheel and printing solenoid for the third column from the left, money totals up to $999.997 could be printed if desired.

In the second row from the left, in Figure 13, "item-count" solenoids are provided for digit keys 1 and 6, while type wheels and printing solenoids are provided for both the first and second rows, representing respectively the item-count "tens" and "units" columns. This permits counting up to 99 items, while moving the item count solenoids to the third row and adding the previously mentioned extra type wheel and printing solenoid would permit counting up to 999 items if so desired. The use of a separate printing solenoid for each digit, all connected in multiple, has some advantage, particularly as to flexibility, but the invention is not limited to this construction, since obviously a single print magnet and a common printing bar could be employed just as readily, and of course, other item counts than 1 and 6 could also be provided for, in cases where it is desired to sell groups of items for a single price, such as 6 for a dollar, two for a quarter, et cetera. The use of group items would require merely that a corresponding number of chutes be multipled together, and operated simultaneously from a single set of perforations in the tape, together with the proper count solenoid of the adding machine.

Figure 14 shows a type wheel assembly, comprising a type wheel 140 and an associated gear wheel 141, rotatably mounted as a unit in a small U shaped bracket 142, by means of the shaft 143. Each such assembly is mounted on the inner side of the long bracket 111 (Fig. 13), by means of screws, and the complete unit is then inserted into the front end of the machine until the gears 140 engage the corresponding gear wheels 144 in the machine, which normally drive the display wheels now removed.

Figure 15 represents, as previously stated, a portion of recording tape having printed thereon the record of an order consisting of 2 items and involving a charge of 32 cents. All zeros are printed, to facilitate reading the values, and should different Comptometers be employed for different classes of goods, each might also be required to print a class symbol on the tape, which could readily be provided on one of the item count tape wheels for example.

In Figure 16, which shows in diagrammatic form, the general arrangement of the recording-tape and ink-ribbon feed mechanisms, considered seen from the front with intervening equipment omitted, the paper tape 112, as it comes from the storage reel 113 on the left, passes under a guide roller 160, threads through the tape and ink-ribbon guide 114, shown in Figure 17, from where it passes between the idler 115 and the drive roller 116. The drive roller is arranged to advance this tape about a foot following each printing operation. Flat braking springs, not shown, are tensioned against the sides of the paper reel 113 and the drive roller 116 to stop these quickly when the power is removed. The ink ribbon 123, seen just below the tape 112 in the center of Figures 16, after passing over guide rollers 161 and 162 at the sides of the machine just beyond the ends of the guide 114, is then carried downward, passed under other guide rollers 163 and 164, through narrow slits cut part way across both ends of the reversing bar 128, and thence to the storage and feed spools 124 and 125. The reversing bar 128 is slidably mounted on the under side of the chassis 100 between rollers 165 and 166 and a similar pair to the rear thereof, with the right angled tips of the reversing bar projecting above the chassis, through holes of a size to permit free lateral movement. Thus when one of the reels such as 125 is almost empty, a small rivet such as 167, located in the ribbon near each end thereof, presses against the slot in the near end of the reversing bar and moves the latter to its other position. This causes the toggle mechanism of Figure 18 to reverse itself, thereby reversing the circuit of the motors 126 and 127 as shown in Figure 17.

In Figure 17, which shows a diagrammatic view of the ink-ribbon feed mechanism considered as seen from above, with intervening equipment omitted, this equipment is shown just after a reversal, with the spool 125 empty and the bar 128 forced to the extreme left by the rivet 167. In this position the toggle mechanism of Figure 18 forces the pin 170 which protrudes through a hole 171 in the floor of the chassis also to the left, and against the operating spring of the snap switch 129. This forces the pin of the snap switch down against a strained contact spring, not shown, on the inside of the snap switch, whereupon this spring changes position quickly and closes a circuit to the driving motor 127. The motor 127 thereupon starts driving the reel 125 at very slow speed through a gear train built into the motor, until the rivet on the other end of the ink ribbon engages the slot in the left end of the reversing bar, thereby forcing the reversing bar and the pin 170 on the toggle mechanism to the right. This closes the internal contacts, not shown, of the snap switch 130, and opens those of snap switch 129, thereby starting motor 126 and stopping motor 127 to reverse the movement. This motor circuit is dead when the motor switch of the Comptometer, not shown, is in the "off" position.

The toggle mechanism controlled by the reversing bar, as shown separately in Figure 18, is considered as seen from below the chassis 100, as if the complete machine had been tilted upward and backward from the front end, so as to preserve the same relationships of right and left as in the other views. Thus in Figure 18, the reversing bar 128 is shown operated to the left, between the front rollers 165 and 166 and the rear rollers 180 and 181. In this position the toggle arm 182 and its reversing pin 170 are also in their left position, being forced into this position by the action of the coiled springs 183 and 184 as the pin 185 in the reversing bar, to which they are attached, passes to the left of the pivot point 186 of the toggle arm. The other positions of the reversing bar and toggle arm are indicated by dotted lines. The numerals 187 and 188 indicate the openings in the floor of the chassis for the tips of the reversing bar, while the opening for the toggle arm reversing pin is indicated at 171.

In Figure 19 which shows the translator circuits including the contact plate, the brushes, and the miscellaneous control relays, the contact plate 8 is at the top of the sheet, with the brushes 15 shown directly below it, as though seen from above, with the direction of movement of the control tape assumed to be towards the top of the sheet as indicated by the arrows. With respect to the functions of the brushes, the three columns on the right contain twelve chute code brushes, the rows representing respectively "thousands," "hundreds," "tens," and "units." On the left the top three rows contain the money brushes, including twelve price code brushes in four columns, with the rows representing respectively "dollars," "tens of cents," and "units of cents," together with a fifth column of three representing "fractions of cents," in this case quarter cents, half cents and three quarter cents. In the bottom row, to the left of the units chute code brushes, are two "item count" brushes, two "comtometer selecting" brushes, and a "cancelling" brush. The "end of paper" brush shown below the others is located in a full row ahead of the first or bottom row, while the control brush, shown on the lower right is also located slightly in advance of the bottom row, in order to prepare the circuits for the other brushes just before they become lined up with the corresponding perforations in the tape. The tape feed motor is indicated at 1974 to the right of the brushes, and the series start contacts 36 and 37, controlled by the translator cover, as previously described, are shown directly below the brushes.

With reference to the miscellaneous control relays shown in Figure 19, the relays 1900, 1910 and 1920 are slow-to-operate "printing sequence" relays controlled from relay 1930 for the successive operation of the Comptometer printing and reset magnets, while the relays 1930 and 1950 are "printing start" relays operated by the end-of-tape brush when the passage of the tape through the translator has been completed. Relay 1940 is the "cancel" relay, which operates whenever a cancel perforation is encountered, to render the associated group of perforations ineffective. Relay 1955 is a normally operated slow-to-release "pulse timing" relay which controls the length of pulse to the chute and key solenoids, and relay 1960 is a "selection reset" relay operated upon the release of relay 1955 to restore the operated select relays in readiness for the next selection. Relays 1965 and 1970 are "pulse start" relays which operate from the select relays to close the operate circuits of the selected chute and key solenoids. Relays 1975 and 1980 are "motor start" relays controlled from the start contacts 36 and 37, relay 1985 is the "contact plate" relay which disconnects ground from the plate 8 as soon as the select relays have operated, and relay 1990 is the "control" relay which operates from the control brush to prepare the operation of the select relays.

In Figure 20, which shows the Comptometer select and code relays, the "select" relays are aligned in a single row across the top of the sheet, while the "code" relays are shown in three groups of four directly below them. The select relays are controlled from the translator brushes and the code relays in turn are controlled from springs of the select relays, such for example as the make contacts 2003 on the left hand select relay 2000. The first four select relays at the left are the "dollars select" relays, which control the first group of code relays A, B, C and D, the second four are the "tens of cents select" relays controlling the second group of code relays A1, B1, C1 and D1, and the third four are the "units of cents select" relays controlling the third group of code relays A2, B2, C2 and D2. The other select relays of Figure 20 have no coding function but operate the indicated fraction and item-count keys and the Comptometer select relays directly.

With reference to the price code relays A, B, C, D etc., the relays of each group operate similarly in combination or singly, to prepare a circuit to any one of the nine digit leads of the corresponding digital order leading to the Comptometers, in accordance with the following table:

| Relays operated: | Digit |
|---|---|
| A | 1 |
| B | 2 |
| C | 3 |
| D | 4 |
| AB | 5 |
| AC | 6 |
| AD | 7 |
| BC | 8 |
| BD | 9 |

Figure 21 shows circuits for three Comptometers including a money totalizing Comptometer shown enclosed by the rectangle 2120, a departmentalizing Comptometer "X" indicated by the rectangle 2130, and a departmentalizing Comptometer "Y" indicated by the rectangle 2140. Leads to a fourth or order totalizing Comptometer "Z," not shown, are also indicated at the upper right, enclosed by the dotted bracket 2160. The Comptometers "X," "Y" and "Z" are all printing Comptometers, exactly like that illustrated in Figures 12 to 18, including "item-count" and "price" key solenoids 106, printing solenoids 107, reset solenoid 108, the tape feed motor 119, and its controlling relay 122 and cam 120. The reset and tape-feed circuits are shown in detail only in Comptometer "X," and are indicated in Comptometer "Y" by the blank rectangle 2150. The "X" and "Y" Comptometers are also operated separately under the control of relays 2100 and 2110, depending on the class of merchandise as indicated by the perforations of the order tape which may include items of either or both classes. The relays 2100 and 2110 are gang relays like that shown and described in Patent No. 2,135,832 issued on November 8, 1938 to Herbert F. Obergfell. Each of the three lower dotted contacts on these relays actually represent nine sets of make contacts, corresponding to the various digits.

Comptometer "Z" on the other hand, operates on all items regardless of class, to give the complete item and price totals for the entire order. These totals are of course, automatically cleared from all three machines following the printing operation, at the completion of the filling of each order. Comptometer 2120 which is a standard non-printing Comptometer except for the addition of price key solenoids as indicated, operates on all items, and continues to accumulate the prices thereof to show the total business done during the day. This machine would be reset by hand at the end of each day, after these figures were copied from the display wheels. If no departmentalizing were desired of course, Comptomers "X" and "Y" and relays 2100 and 2110 would not be required, and the key solenoids of the Comptometers 2120 and "Z" would merely be connected together in multiple as shown. The brushes X and Y in the translator would then be available for other uses.

In Figure 22 which shows the chute select and code relays and three of the chute connect relays, the chute select relays are shown across the top of the sheet, and the chute "code" relays are shown in four groups of three below them. Here again the select relays are controlled from the corresponding translator brushes, and the code relays are controlled in turn from springs on the select relays, such for example as the springs 2203 of the left hand select relay 2200. The first three chute select relay are the "thousands select" relays which control the first group of chute code relays E, F and G, the second three are the "hundreds select" relays controlling the second group of chute code relays E1, F1 and G1, the third three are the "tens select" relays controlling the third group of chute code relays E2, F2 and G2, while the fourth three are the "units select" relays controlling the fourth group of chute code relays E3, F3 and G3.

The code relays E, F, G, etc. in turn, control various chute connect relays, such for example as the relays 2270, 2280 and 2290 shown at the lower right in Figure 22. The code relays of each group operate similarly, in combination or singly, to prepare a circuit to any one of eight digit leads of the corresponding digital order leading to the chute connect relays, in accordance with the following table:

Relays Operated: | Digit
--- | ---
None | 1
E | 2
F | 3
G | 4
EF | 5
EG | 6
FG | 7
EFG | 8

In Figure 23, at the upper left thereof, are shown four "thousands connect" relays 2310, 2320, 2330 and 2340, out of a possible total of eight. These relays are controlled from the code relays E, F and G of Figure 22, and are each provided, as indicated, with eight pairs of make contacts. One spring of each of these contact pairs is connected in multiple to corresponding springs of the other relays and to a corresponding spring on the code relay E1 of Figure 22. The other spring of each pair is connected to an individual multi-contact "hundreds connect" relay, such as 2350 and 2355, eight of which, carrying 64 pairs of make contacts each, are required for each thousands group. In the drawing, these relays are indicated as single relays, for convenience, but actually each is intended to represent two gang relays operated in multiple, of the general type covered by the previously mentioned Patent No. 2,135,832, issued to Herbert F. Obergfell. The "tens connect" relays are shown in Figure 22 as previously mentioned, only the first, second and eighth being shown however, bearing respectively the numerals 2270, 2280 and 2290. These relays, which are controlled from the code relays E2, F2 and G2, serve to connect the units conductors from the code relays E3, F3 and G3 through to the contacts of the operated hundreds connect relay in the selected thousands group. This will prepare the circuit of the selected chute operating or "units connect" relay, of which four are shown at the lower left in Figure 23, numbered 2360, 2365, 2370 and 2375. The selected units relay operates when the control relays of Figure 19 connect ground battery to the springs of the G3 units code relay, and serves in turn to operate the corresponding chute solenoid. These solenoids, four of which are shown numbered 1182, 1188, 2825 and 2888 utilize alternating current rather than direct, because of their considerable current drain. The total number of chute solenoids in each tens group is 8, in each hundreds group 64, and in each thousands group 8×64 or 512. Thus with four "hundreds" groups 4×512 or 2048 chutes could be operated, and with eight "hundreds" groups 4096 chutes could be operated, from the brush arrangement illustrated.

The description of the drawings and apparatus and the general mode of operation having been completed, a typical customer order, as represented by the two-item order tape illustrated in Figure 7, will be theoretically put through the translator, in order to show the operation of the circuits of Figures 19 to 23 in more detail, and facilitate complete understanding of the system.

The cashier upon receiving the tape, inserts it in the translator in the position shown in Figure 7 and closes the translator cover, as previously mentioned. The front end of the tape prevents any electrical contact between the contact plate 8 and the brushes 15, but when the cover is completely closed, plate 8 presses the tape lightly against the brushes, and the start contacts 36 and 37 close an obvious circuit for the motor start relay 1980 from ground at contacts 36 to negative battery through the winding of the said relay. Relay 1980 operating, at its make contacts 1982 prepares a circuit for control relay 1990, and at make contacts 1981 closes an obvious circuit to the motor-start power relay 1975 which operates, and starts the tape feed motor 1974. The tape is then driven quickly through the translator by the motor, and causes the required operations.

The passage of the first ranks of perforations over the first rows of brushes is without effect, and nothing happens until the first control hole, on the extreme right side of the tape, encounters the translator control brush, just as the various rows of perforations in the first group, representing item number 1182 in Class X at a price of 15 cents, are about to engage their corresponding brush rows. The control brush thereupon completes a circuit for the operation of the control relay 1990, as follows: ground from break contacts 1986 on contact plate 8, through the control hole to the control brush, break contacts 1952, make contacts 1982, and the winding of relay 1990 to negative battery. Relay 1990 upon operating over this circuit, at make contacts 1992 locks itself operated to ground at break contacts 1962, and at make contacts 1991 connects negative battery from break contacts 1961 to the windings of the various item and price select relays of Figures 22 and 20 as well as to relays 1940 and 1950 in Figure 19, in order to make all these relays operative.

Immediately thereafter, all of the remaining perforations of the group will engage their brushes simultaneously, and will cause the operation of the associated select relays from the same common ground on contact plate 8. In the three item columns on the right side of the tape for example, it will be noted from the intersections of the dotted lines which have been superimposed on Figure 7 to show the hole locations, that there are no holes in the "thousands" and "hundreds" rows, three in the "tens" row, and one in the first column of the "units" row. These last will cause the operation of the 7th, 8th, 9th and 10th select relays in Figure 22. Likewise, in the five price columns on the left side of the tape, it will be noted that there are no perforations in the "fractions" column, none in the "dollar" row, one in the first column of the "tens of cents" row, and two in the "cents" row, in the first and second columns. These perforations will cause the operation of the 5th, 9th and 10th select relays in Figure 20. Finally, the "count 1" and "X" perforations in the last row will cause the operation of the 16th and 18th select relays in Figure 20.

The operated select relays immediately lock to ground at their upper make contacts, and at their make contacts corresponding to contacts 2202 and 2002 connect ground to the windings of the contact plate relay 1985 and the pulse start relay 1970 in Figure 19, both of which operate. At the same time, the operated 7th, 8th, 9th and 10th select relays of Figure 22, at their respective make contacts 2233, 2238, 2243 and 2248 cause the operation of code relays E2, F2 and G2, and E3 in an obvious manner. Similarly, the operated 5th, 9th and 10th select relays of Figure 20 at their make contacts 2023, 2043 and 2048 cause the operation of code relays A1 and A2 and B2, while the operated 16th and 18th select relays, at their make contacts 2078 and 2088 prepare itemcount and Comptometer selecting circuits.

Meanwhile, the operation of relay 1985 from the select relays opens break contacts 1986, thereby removing ground from contact plate 8, in order to prevent false operations as the first set of perforations pass over and beyond the upper rows of brushes. Relay 1970, which is connected in multiple with 1985 and therefore operates at the same time, as stated in the preceding paragraph, at make contacts 1971 connects ground to conductor 2205 and hence to the springs of the "thousands," "hundreds" and "tens" code relays in Figure 22. The code relays E, F and G being normal at this time, this ground passes through the outer break contacts on these relays to operate the first thousandsconnect relay 2310 in Figure 23. The code relays E2, F2 and G2 being operated, this same ground also passes through the inside make contacts of these relays to operate the eighth tens-connect relay 2290 which extends the units conductors from the E3, F3 and G3 code relays through to the springs of the hundreds connect relays of Figure 23. Also, upon the operation of the first thousands connect relay 2310 this same ground passes through the outer break contacts of the code relays E1, F1 and G1, which are normal, and through the outer make contacts of relay 2310 to operate the first hundreds-connect relay 2350 of the first thousands group. Relay 1970 also, at make contacts 1972 causes the operation of pulse start relay 1965, and at break contacts 1973 opens the operate circuit of the pulse timing relay 1955. The charged condenser 1958A now begins to discharge through relay 1955 however, and maintains this relay operated for a definite interval. Condenser 1958A becomes charged at each operation of relay 1955, upon the closure of make contacts 1958.

Pulse start relay 1965 upon operating from relay 1970, at make contacts 1966 closes a circuit for the operation of the units connect or chute operate relay 2360 as follows: ground at break contacts 1942, break contacts 1954, make contacts 1956 and 1968, conductor 2204, break contacts of the units code relay G3, outer break contacts of the units code relay F3, outer make contacts of the operated units code relay E3, second make contacts from the left on the operated tens-connect relay 2290, make contacts 2351 on the operated hundreds connect relay 2350, and the winding of relay 2360 to negative battery. Relay 2360 operating, causes chute solenoid 1182 to trip chute number 1182 which ejects the required item.

Pulse start relay 1965 also at make contacts 1967 connects ground to the springs of the price code relays and the individual select relays of Figure 20 from break contacts 1941, by way of break contacts 1954A, make contacts 1959 and 1967, and conductor 2004. A portion of this ground thereupon passes through make contacts of the operated price code relay A1, inner break contacts of code relays B1, C1 and D1, and cable 2172 to the first or bottom key solenoid such as 2121, in the "tens of cents" column of the totalizing Comptometer 2120, and also in Comptometer "Z," whereupon both of these solenoids operate in parallel. Another portion of this ground passes through inner make contacts on the operated price code relays A2 and B2 and the cable 2175 to the fifth key solenoid such as 2122 in the "cents" column of Comptometer 2120 and Comptometer "Z," and both of these solenoids operate in parallel and advance their type wheels. Still other portions of this ground pass through make contacts 2078 on the operated 16th select relay in Fig. 20 and conductor 2174 to the 1st item count solenoid in Comptometer "Z" which operates, and through make contacts 2088 on the operated 18th select relay in Figure 20 and conductor 2171, to the Comptometer select relay 2100 which also operates and closes its various make contacts. Thereupon, the ground on conductor 2174 passes through make contacts 2102 and operates the 1st item count solenoid 2138 in Comptometer "X," while the grounds from the "tensof-cents" and "cents" code relays pass by way of the cables 2172 and 2175 through contacts corresponding to the upper and middle dotted contacts on the relay 2100 to operate the key solenoids 2131 and 2132 in the Comptometer "X." Comptometers X and Z and 2120 will accordingly advance their price type wheels to record the price of the first item as 15 cents, while Comptometers X and Z will in addition advance their item count type wheels to indicate a count of 1.

Shortly after the first group of perforations in the tape has moved clear of all of the brushes, the pulse timing relay 1955 restores, due to the condenser 1958A becoming discharged, the discharge time in seconds being equal to the product of the condenser capacity in farads times the resistance of the coil in ohms. Relay 1955 thereupon opens its make contacts 1956, 1958 and 1959, and closes its break contacts 1957. Contacts 1956 remove ground from conductor 2204 and the chute relay 2360 which thereupon restores and releases chute solenoid 1182, while contacts 1959 remove ground from conductor 2004 and hence from the operated Comptometer key solenoids and the Comptometer select relay 2100, which also restore. Make contacts 1958 open the condenser circuit, and break contacts 1957 cause the operation of selection reset relay 1960. Relay 1960 operating, at break contacts 1962 removes locking ground from control relay 1990 which restores, since its operate circuit is now open at the control brush. Relay 1960 also, at break contacts 1961 disconnects negative battery from the select relays of Figures 22 and 20, and the operated relays in these groups restore, together with their associated code relays. The release of the select relays in turn removes ground from relays 1985 and 1970 and these relays both restore. Relay 1985 replaces ground on contact plate 8, while relay 1970, at make contacts 1971 opens the circuit of the operated chute connect relays which restore; at make contacts 1972 opens the circuit of relay 1965 which restores; and at break contacts 1973 re-establishes the circuit of pulse timing relay 1955 which re-operates, to re-charge the condenser 1958A and to release relay 1960.

The second group of perforations, representing item number 2825, also in class X, and priced at 17 cents, now passes over the brushes, and just as these holes are lined up before their respective brushes, the second control hole engages the control brush, whereupon control relay 1990 again operates and locks, to prepare the operation of the select relays as before. In the three item columns on the right side of the tape, it will be seen that there is one hole in first column of the "thousands" row, three holes in the "hundreds" row, one hole in the first column of the "tens" row, and two holes in the "units" row, in the first and second columns. When therefore these holes engage their corresponding brushes, they cause the operation of the 1st, 4th, 5th, 6th, 7th, 10th and 11th select relays in Figure 22. Likewise, in the five price columns on the left, it will be noted that there are again no perforations in the "fractions" column, that there are no perforations in the "dollar" row, one in the first column of the "tens of cents" row, and two in the "cents" row, in the first and fourth columns. These perforations will cause the operation of the 5th, 9th and 12th select relays in Figure 20, while the "count 1" and "X" perforations in the last row will operate the 16th and 18th select relays as before.

The operated select relays lock to their upper make contacts, and cause the operation of the contact plate and pulse start relays 1985 and 1970 as before. At the same time, the operated 1st, 4th, 5th, 6th, 7th, 10th and 11th select relays of Figure 22, at their respective make contacts 2203, 2218, 2223, 2228, 2233, 2248 and 2253, cause the operation of the associated item code relays E, E1, F1 and G1, E2 and E3 and F3, while the operated 5th, 9th and 12th select relays in Figure 20, at their make contacts 2023, 2043 and 2058 cause the operation of the associated price code relays A1, and A2 and D2. The operated 16th and 18th select relays in Figure 20 prepare the circuits of the 1-count solenoids and the X-Comptometer-select relay 2100, as before.

Contact plate relay 1985 operating, again removes ground from contact plate 8, while pulse start relay 1970 at break contacts 1973 opens the operate circuit to the pulse timing relay 1955, at make contacts 1972 closes the operate circuit of pulse start relay 1965, and at make contacts 1971 puts ground on the springs of the thousands, hundreds and tens code relays of Figure 22, as before, by way of conductor 2205. Code relay E being operated at this time, this ground passes through the outer break contacts of the G and F relays and the outer make contacts of the operated E relay to operate the second thousands-connect relay 2320. This same ground at the same time passes through the outer break contacts of the un-operated G2 and F2 code relays and the outer make contacts of the operated E2 relay to operate the second tens-connect relay 2280. Upon the operation of the thousands-connect relay 2320 the ground on conductor 2205 passes through the inner make contacts of the operated G1, F1 and E1 code relays and the inner make contacts of the operated thousands-connect relay 2320, and operates the eighth hundreds-connect relay 2355 of the second thousands group.

Pulse start relay 1965 upon operating, at make contacts 1966 causes the operation of the chute operate relay 2370, over the following circuit; ground at break contacts 1942, break contacts 1954, make contacts 1956 and 1966, conductor 2204, break contacts of the un-operated code relay G3, outer make contacts of the operated code relay F3, second outer make contacts of the operated code relay E3, fifth make contacts from the left on the operated tens-connect relay 2280, make contacts 2356 on the operated hundreds-connect relay 2355, and the winding of relay 2370 to negative battery. Relay 2370 upon operating over this circuit connects alternating current to chute solenoid 2825 which thereupon trips chute number 2825 for the ejection of the second item of the order.

Pulse start relay 1965 also at make contacts 1967 connects ground to conductor 2004 as before, from break contacts 1941, by way of break contacts 1954A and make contacts 1959. This ground thereupon passes through make contacts of the operated tens-of-cents code relay A1, inner break contacts of the un-operated tens-of-cents code relays B1, C1 and D1, and cable 2172 to the digit-1 key solenoids in the "tens-of-cents" row, in the totalizing Comptometers 2120 and "Z," and both of these solenoids operate and advance their type wheels. Another portion of this ground also passes through make contacts of the operated "cents" code relay A2, inner break contacts of the un-operated B2 and C2 code relays, inner make contacts of the operated D2 code relay, and cable 2175 to the digit-7 key solenoids in the cents row of the totalizing Comptometers 2120 and "Z" whereupon both of these solenoids also operate and advance their type wheels. Another portion of this ground passes through make contacts 2078 as before to operate the bottom item count key solenoid on Comptometer "Z" which also advances its type wheel. And still another portion passes through make contacts 2088 as before to operate the Comptometer select relay 2100. The ground from make contacts 2078 on conductor 2174 thereupon passes through make contacts 2102 to the bottom item-count key solenoid 2138 in Comptometer "X" which operates and advances its type wheel, while the grounds from the price code relays through the cables 2172 and 2175 pass through make contacts corresponding to the upper and middle dotted contacts on relay 2100 to the digit-1 key solenoid 2131 and the digit-7 key solenoid 2133 in the Comptometer "X," both of which operate and advance their type wheels to add in the second price.

Meanwhile, the second group of perforations has also moved clear of the brushes, and shortly thereafter, pulse timing relay 1955 again restores, after the usual delay, and again removes ground from conductors 2204 and 2004 to release the operated chute and key solenoids as before. Relay 1955 also at break contacts 1957 re-operates the selection reset relay 1960 which in turn causes the release of the control relay 1990 and the operated select relays of Figures 22 and 20. The select relays releasing, cause the release of relays 1985 and 1970. Relay 1985 re-grounds the translator contact plate, while relay 1970 releases pulse start relay 1965 and the operated connect relays, and re-operates pulse timing relay 1955. This causes the re-charging of the timing condenser 1958A and the release of relay 1960, as before.

The end of the tape now clears the "end-of-paper" brush, and shortly thereafter, clears the "control" brush, causing both of these brushes to make contact with plate 8, now grounded from contacts 1986. The end of paper brush is without immediate effect, due to the fact that the battery feed for relay 1950 is open at make contacts 1991. As soon as the tape clears the control brush however, control relay 1990 operates and completes the circuit of relay 1950 which also operates and locks, through its upper winding and its preliminary make contacts 1951, to the start contacts 36 and 37. Relay 1950 also, at break contacts 1952 opens the operate circuit of relay 1990 now locked to break contacts 1962, and at break contacts 1954 and 1954A disables the circuits leading to conductors 2204 and 2004 to prevent the operation of any chute or key solenoids at this time. Relay 1950 further, at make contacts 1953 closes a circuit to the print start relay 1930 which operates.

Print start relay 1930 upon operating, closes a circuit to the printing solenoids 107 of the Comptometers X, Y and Z by way of break contacts 1922 and conductor 2176, and the printing solenoids operate and print the accumulated totals, in this case, an item count of 2 and a price total of 32 cents for Comptometers X and Z and nothing for Comptometer Y. This same ground from make contacts 1931 also causes the operation of the slow to operate print sequence relay 1920 after a short delay, to allow time for the proper operation of the printing solenoids. Relay 1920, at make contacts 1921 closes a circuit to the slow to operate print sequence relay 1910, at break contacts 1922 opens the printing circuit, and at make contacts 1922 closes the reset circuit by way of break contacts 1901 and conductor 2177. This causes the simultaneous operation of the reset solenoid 108 and the tape feed relay 122 in the Comptometers X, Y and Z. The reset solenoids restore any off normal type wheels to zero, and the tape feed relays at make contacts 122A connect alternating current to the tape feed motors 119. The tape feed motor upon starting, closes contacts 121 from the cam 120 thereby shunting contacts 122A. The motors thereupon make one complete revolution and stop, advancing the recording tapes the required amount. Sequence relay 1910 operating after a slight delay, closes a circuit to sequence relay 1900, which also operates after a similar delay and opens the reset circuit. This permits motor 119 to stop when the cam again opens contacts 121 at the Comptometer.

Meanwhile the end of the translator tape has cleared the bottom row of brushes of Figure 19, permitting the operation of the corresponding select relays as well as the cancel relay 1950. The cancel relay further opens the chute and key solenoid operate circuits and the select relays again operate relays 1985 and 1970. Relay 1985 takes ground off the contact plate to prevent the operation of any more select relays, and relay 1970 re-operates relay 1965 and opens the pull up circuit of relay 1955. The operation of relay 1955 is without effect, but the release of relay 1955 which occurs after the usual delay period, re-operates relay 1960. Relay 1960 releases the control relay 1990, the cancel relay 1940, and any operated select, code and connect relays. The release of the select relays causes the release of relays 1985 and 1970. The release of relay 1985 is without effect but the release of relay 1970 causes the release of relay 1965 and the reoperation of relay 1955.

The cashier upon seeing the control tape ejected from the translator, presses the cover release button, which causes the cover to open and break the contact between the plate 8 and the brushes. Start contact 36 also opens and causes the release of relays 1950 and 1980. Relay 1950 causes the release of relay 1930, which releases the print sequence relays 1920, 1910 and 1900. Relay 1980 causes the release of relay 1975, which stops the translator motor. The equipment is now again normal and ready to handle another order.

To cancel an item, the cashier, before inserting the control tape in the translator, punches out the cancel hole in the corresponding group of perforations, as previously mentioned. This hole is made somewhat larger than the other perforations, so that it engages its brush about the same time as the control hole. Relay 1990 operates from the control hole and connects negative battery to relay 1940 which thereupon operates from the cancel hole, and at break contacts 1941 and 1942 disables the conductors 2004 and 2204 to prevent any Comptometer or chute operation. The other perforations then engage their brushes, and the corresponding select relays operate. Relays 1985, 1970 and 1965 then operate and 1970 opens the circuit of relay 1955. The perforations representing the cancelled item now move clear of the brushes, and when relay 1955 restores, it operates relay 1960 which unlocks the control relay 1990, which in turn unlocks the cancel relay 1940, and the equipment is ready for the next group of perforations, or the end of the tape, as the case may be. Since no chute or Comptometer operation occurs for a cancelled item, it is completely excluded from the order, and from the Comptometer totals.

The invention having now been described, what is considered new and is desired to have protected by Letters Patent, is set forth in the claims which follow.

What is claimed is:

1. In a control system including a plurality of devices operable from a control tape having separate groups of perforations therein representing particular ones of said devices with each group of perforations arranged in a plurality of rows and columns, a translator, a motor driven feed roller for passing said tape through said translator in a single uninterrupted movement, stationary sensing brushes in said translator arranged in similar rows and columns such that the perforations of each group engage all of the brushes in the corresponding column, electrical circuits controlled by said brushes for momentarily operating a plurality of said devices simultaneously from each said group in accordance with the perforations in different ones of the said rows and columns of such group only when all of the perforations of such group are engaged by their corresponding brush, and an end of tape relay operated by certain of said brushes in response to the completion of the passage of said tape through said translator for disabling said devices to prevent further operation thereof.

2. In a control system including a plurality of devices selectively operable from a control tape having spaced apart groups of perforations and perforation spaces therein representing numbers corresponding to said devices with the perforations and perforation spaces of each group arranged in a plurality of transverse rows representing different digital orders, a tape translator having a plurality of contact brushes corresponding to said perforation spaces and arranged in similar rows, a motor for driving said tape in one continuous longitudinal movement through said translator and over said brushes, with each said number perforation passing over a plurality of said brushes, selection circuits completed simultaneously by the passage of said continuously moving tape over said brushes from perforations in a plurality of rows in each group and the corresponding brushes for selectively operating one or more of said devices, a control brush and an end-of-tape brush in said translator, circuits controlled by said control brush and a perforation in each group for enabling said selection circuits when all of the number perforations of the group are engaged by their respective brushes, and circuits jointly controlled by both of said last named brushes in response to the rear end of said tape clearing said brushes for disabling said selection circuits to prevent false operations of said devices.

3. In a control system for selectively operating any desired ones of a plurality of control devices from a tape having spaced apart groups of markings along its length with each separate group of markings arranged in a plurality of rows and columns, a tape translator, motor driven feed means for feeding said tape through said translator in one continuous unidirectional movement, separate groups of select relays, non-moving sensing devices in said translator arranged in rows and columns corresponding to the rows and columns defining said markings so that each marking passes over all of the sensing devices in the corresponding column, select circuits closed simultaneously by said sensing devices through all of the markings of a group in the moving tape when all of said markings are opposite their corresponding sensing device in the corresponding row and column to cause the simultaneous operation of one or more select relays in each of said select relay groups, operate circuits completed by said operated select relays to cause the operation of the selected control devices, and a group of timing relays controlled only by said markings and said sensing devices for timing the operation and release of said control devices and for restoring the operated select relays after the passage of each said group of said markings.

4. In a tape translator, a group of sensing brushes arranged in a plurality of rows for sensing a tape having a perforating space individual to and corresponding to each of said brushes and having perforations in only certain ones of said spaces and each perforation corresponding to an individual one of said brushes, driving means for moving said tape past said brushes continuously in a single direction through said translator, said brush arrangement causing certain of said brushes in a plurality of said rows to momentarily extend simultaneously through their individual corresponding perforations and causing others of said brushes to momentarily extend through said same perforations during the movement of said tape, electrical circuits connected to said brushes, and contacts independent of said driving means for preventing completion of said circuits while said other brushes extend through said perforations and for completing said circuits in response only to said certain brushes extending through their individual corresponding perforations.

5. In a tape translator, a group of sensing brushes arranged in a plurality of horizontal rows and a plurality of vertical rows with a plurality of brushes in each said row for sensing a tape having a perforating space corresponding to each of said brushes and having perforations in only certain ones of said spaces in each of said horizontal rows, means for moving said tape uninterruptedly past said brushes to cause said brushes to extend through said perforations in both corresponding and non-corresponding perforation spaces during movement of said tape, electrical circuits, and relay means controlled directly from one of said brushes for making said brushes effective to complete said circuits through perforations in corresponding perforating spaces in a plurality of said horizontal rows simultaneously and for making said brushes ineffective to complete said circuits through said perforations in non-corresponding perforation spaces during movement of said tape.

6. In a tape translator, a group of sensing brushes arranged in a plurality of rows for sensing a tape having a perforating space individual to each of said brushes and having perforations in only certain ones of said spaces and each perforation corresponding to an individual one of said brushes, means for moving said tape unidirectionally past said brushes without interruption, the arrangement of said brushes and perforations being such as to cause certain of said brushes in a plurality of rows to momentarily extend through their individual corresponding perforations and to cause others of said brushes to momentarily extend through said same perforations during the movement of said tape, electrical circuits prepared by said extending brushes, and relay means controlled by said extending brushes for making said certain brushes effective to complete said circuits simultaneously in response only to all of said certain brushes extending through their corresponding individual perforations and for making both said other and said certain brushes ineffective to complete said circuits in response to said brushes extending through perforations which are not individual to and do not correspond to said brushes.

7. In a tape translator, a group of sensing brushes arranged in horizontal rows and in vertical rows with a plurality of brushes in each horizontal row and in each vertical row for sensing a tape having a plurality of spaced apart groups of perforation spaces, the perforation spaces of each such group arranged in rows similar to said brush rows and each such group comprising a perforation space individual to a corresponding one of said brushes, coded data perforations in a plurality of said horizontal and vertical rows in each group of perforation spaces designating data information, means for moving said tape in a continuous unidirectional movement over said brushes to sense said coded data information in said plurality of said groups of perforation spaces, electrical circuits, said brushes normally inactive to complete said circuits through said perforations during movement of said tape, and relay means operated directly from one of said brushes for making said brushes active to complete said circuits through said perforations in each said group in turn in response only to said tape simultaneously aligning each perforation space of such group over its individual and corresponding brush.

8. In a tape translator for sensing a tape having a plurality of groups of perforation spaces, with each such group having its perforation spaces arranged in horizontal rows and in vertical rows with a plurality of spaces in each horizontal row and in each vertical row, a group of sensing brushes comprising as many brushes as there are perforation spaces in any group of perforation spaces, said brushes arranged in similar horizontal and vertical rows and each brush corresponding to a perforation space, coded data perforations in each group of perforation spaces arranged in predetermined ones of said spaces in a plurality of said horizontal and vertical rows in each group in accordance with coded data information pertaining to articles of merchandise, means for moving said tape in a continuous unidirectional movement over said brushes to sense said coded data perforations in a plurality of said groups of perforation spaces, electrical circuits completed by said brushes and said moving perforations, said brushes normally inactive for completing said circuits through said perforations during the greater portion of the movement of said tape, and a relay operated from one of the perforations of each group for making said brushes active to complete said circuits simultaneously through said perforations in each one of said groups in succession in response only to the operation of said relay and the aligning of each perforation space of said one group over its corresponding brush.

9. In a control system including a plurality of magnet operated devices selectively operable from a moving tape having spaced apart groups of markings arranged in columns at regular intervals along its length with each group of markings representing separate items of data and including a separate control marking, a tape translator having a passageway therein for said tape and a plurality of sensing devices arranged in columns parallel with said passageway to correspond with said markings such that the location of each marking of a group corresponds to only one of said sensing devices, drive means for passing said tape uninterruptedly through said passageway past said sensing devices such that each item marking of a group is successively aligned with all of the sensing devices of the corresponding column, select relays a plurality of which are operated simultaneously from different ones of said sensing devices in response to the passage of each group of said markings for selectively operating certain of said magnet operated devices, a control sensing device in said translator, and a control relay controlled by such group's control marking and said last named sensing device for delaying the energization of any of said select relays until all of the item markings of such group are properly aligned opposite their respective corresponding sensing devices.

10. In a remote control system, a plurality of electrically operated devices, a perforated tape, a tape translator, a motor for driving said tape through said translator, means in said translator for sensing the perforations in the moving tape, a hinged cover arranged to be closed down over said tape after the latter has been inserted into the translator, a latching pin mounted on the under side of said cover at right angles thereto, an opening in the top of said translator to allow the passage of the end of said pin when said cover is closed, a pointed tip for latching pin, a slot in said pin just above said pointed tip, a movable latching bar protruding into said opening in the path of said latching pin so as to be moved sidewise by the point of said pin when said cover is closed, a first pair of normally closed start contacts for said translator opened in response to said sidewise movement of said latching bar, a second pair of normally open start contacts closed in response to the downward pressure of said latching pin after said first contacts have opened, means for forcing said latching bar into the slot of said latching pin when said cover is fully closed to lock said cover and re-close said first contacts, a circuit completed in response to the closing of both of said pairs of contacts to start said motor, and circuits completed in response to the passage of said perforations past said sensing means to select and operate any of said devices.

11. In a remote control system, a plurality of electrically operated devices, a perforated tape, a tape translator, a motor drive therefor, contact brushes therefor, a hinged cover arranged to be closed down over said tape when the latter is in driving position in said translator, a latching pin on the under side of said cover, an opening in the top of said translator to allow the passage of the lower end of said pin when said cover is closed, a latching bar moved sidewise in response to the passage of said pin into said opening, normally closed contacts opened in response to said sidewise movement, normally open contacts closed in response to the downward pressure of said latching pin after said normally closed contacts have opened, means to cause a return movement of said latching bar when said cover is fully closed to lock said latching pin and said cover and re-close said normally closed contacts, a circuit completed in response to the closing of both said normally closed and said normally open contacts to start said motor drive to driving said tape and said perforations over said brushes, brush circuits completed in response to the passage of said perforations over said brushes to select and operate certain of said devices, and manual means for momentarily withdrawing said latching bar to release said pin and said cover, thereby to disable all of said brush circuits and stop said motor drive.

12. In a remote control system, a plurality of electrically operated devices, a tape translator, a plurality of contact brushes arranged in a plurality of rows and columns in said translator, a perforated tape, a hinged cover for said translator, a resiliently mounted contact platen on the under side of said cover for pressing said tape against said brushes when said cover is closed, a motor for driving said tape through said translator and over said brushes, stops to limit the downward movement of said platen independently of said cover, latching means for locking said cover closed after a definite further movement to store tension in said platen, start contacts closed only when said cover is so locked to start said tape driving motor, and circuits completed from said platen to certain of said brushes, in response to said perforations passing over said brushes to operate certain of said devices in accordance with the location of said perforations in said tape.

13. In a control system including a plurality of electromagnets selectively operable from a control tape having spaced apart groups of markings along its length with the markings of each said group arranged in rows and columns representing coded items of data and each group including a control marking, a group of code relays for the selective operation of said electromagnets and a group of select relays for the selective operation of said code relays, a tape translator and a set of sensing devices therefor including a control sensing device and a plurality of item sensing devices arranged in rows and columns corresponding to those of said item markings, means for driving said tape through said translator and past said brushes in one continuous movement, with each item marking successively engaging all of the sensing devices in the corresponding column, a control relay operated in response to each control marking engaging said control sensing device just as the other markings of the group engage the corresponding sensing device in the corresponding row and column, circuits closed simultaneously by the sensing devices in a plurality of said rows and columns in response to said last named engagement and the operation of said control relay for operating certain of said select and code relays to operate desired ones of said electromagnets, timing relays controlled by certain of said tape operated relays for releasing said tape operated relays before the arrival of the next group of perforations, and circuits closed in response to the rear end of said tape clearing said sensing devices for rendering said sensing devices and relays ineffective to further operate said electromagnets.

EDWARD S. PETERSON.

REFERENCES CITED

The following references are of record in the file of this patent:

UNITED STATES PATENTS

| Number | Name | Date |
|---|---|---|
| 526,130 | Hollerith | Sept. 18, 1894 |
| 1,296,727 | Wright | Mar. 11, 1919 |
| 1,496,358 | Pailthrope | June 3, 1924 |
| 1,836,671 | Langford | Dec. 15, 1931 |
| 1,854,446 | Campbell | Apr. 19, 1932 |
| 2,220,489 | Lowkranty | Nov. 9, 1940 |
| 2,258,290 | Johnstone | Oct. 7, 1941 |
| 2,276,293 | Farmer | Mar. 17, 1942 |
| 2,288,770 | Armbruster | July 7, 1942 |
| 2,352,027 | Smith | June 20, 1944 |
| 2,353,002 | Armbruster | July 4, 1944 |
| 2,377,762 | Daly | June 5, 1945 |
| 2,395,557 | Leathers | Feb. 26, 1946 |
| 2,412,368 | Tascher | Dec. 10, 1946 |
| 2,416,625 | Hooper | Feb. 25, 1947 |
| 2,434,500 | Leathers | Jan. 13, 1948 |
| 2,442,970 | Carroll et al. | June 8, 1948 |
| 2,478,275 | Johnson | Aug. 9, 1949 |
| 2,508,603 | Gollwitzer | May 23, 1950 |

FOREIGN PATENTS

| Number | Country | Date |
|---|---|---|
| 426,270 | Great Britain | Apr. 1, 1935 |